(12) United States Patent
Matsuura

(10) Patent No.: US 8,710,447 B2
(45) Date of Patent: Apr. 29, 2014

(54) CONTROL DEVICE FOR RADIATION IMAGING APPARATUS AND CONTROL METHOD THEREFOR

(75) Inventor: Tomohiko Matsuura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/590,948

(22) Filed: Aug. 21, 2012

(65) Prior Publication Data

US 2013/0068955 A1    Mar. 21, 2013

(30) Foreign Application Priority Data

Aug. 22, 2011   (JP) .................................. 2011-180586

(51) Int. Cl.
*H01L 27/146*   (2006.01)
*G01T 1/24*   (2006.01)

(52) U.S. Cl.
CPC ...................................... *G01T 1/247* (2013.01)
USPC .................................................... 250/370.09

(58) Field of Classification Search
CPC ... H04N 3/155; H04N 5/3559; H04N 5/3745; H04N 5/243; H04N 5/378; H04N 3/353; H01L 27/146; G01T 1/247
USPC ........................ 250/370.01–370.15; 378/98.8
See application file for complete search history.

(56) References Cited

U.S. PATENT DOCUMENTS

| | | | |
|---|---|---|---|
| 2004/0234032 A1* | 11/2004 | Nokita | ......................... 378/98.8 |
| 2008/0018763 A1 | 1/2008 | Sato | |
| 2008/0112651 A1* | 5/2008 | Cho et al. | ...................... 382/312 |
| 2011/0108735 A1 | 5/2011 | Ruetten et al. | |

FOREIGN PATENT DOCUMENTS

| | | | |
|---|---|---|---|
| JP | 8256293 A1 | 10/1996 | |
| JP | 2003134396 A | 5/2003 | |

* cited by examiner

*Primary Examiner* — Kiho Kim
(74) *Attorney, Agent, or Firm* — Canon USA Inc. IP Division

(57) ABSTRACT

A control device that controls a sensor capable of changing a magnitude of an accumulation capacitance of an electric charge for each pixel includes an acquisition unit configured to acquire an output value according to an accumulated electric charge of each pixel of the sensor, a determination unit configured to determine whether the accumulation capacitance of each pixel is saturated based on the output value, and a setting unit configured to set magnitude of the accumulation capacitance for each pixel according to the determined accumulation capacitance.

23 Claims, 18 Drawing Sheets

US 8,710,447 B2

CONTROL DEVICE FOR RADIATION IMAGING APPARATUS AND CONTROL METHOD THEREFOR

BACKGROUND

1. Technical Field

The present disclosure relates to a control device, an imaging apparatus and a control method.

2. Description of the Related Art

Nowadays imaging apparatuses using semiconductor sensors are utilized in various fields. For example, in X-ray imaging apparatuses for medical or industrial purposes, a method of using an X-ray detector in which a phosphor and a large-area amorphous silicon (A-Si) sensor are brought into close contact with each other and enabling an X-ray image to be directly digitalized without involving, for example, an optical system is in practical use.

In current use of X-ray sensors, an amplification unit and a drive mode switching unit (switch unit) corresponding to a drive mode are provided in each pixel by using a single crystal image sensor such as silicon. Japanese Patent Application Laid-Open No. 2003-134396 discusses a technique for providing a plurality of source follower amplifiers with different gate sizes for each pixel in an X-ray sensor. According to this technique, in a low-dose imaging mode, a source follower amplifier with a small gate size is selected for all pixels of the sensor, so that the sensor can be made highly sensitive. On the other hand, in a relatively high-dose imaging mode, a source follower amplifier with a large gate size is selected for all pixels of the sensor, so that imaging with a low noise and a wide dynamic range can be realized, However, when the amount of radiation received by the X-ray sensor is largely different for each pixel of the sensor, there is an issue in that saturation or input/output characteristics may be deteriorated for certain pixels which receive a large amount of light, whereas contrast will become low in pixels which receive a small amount of light. Therefore, when the received radiation is largely different among pixels, good contrast could not be obtained while reducing the saturation in the entire image.

SUMMARY

According to at least one embodiment of the present invention, a control device controls a sensor capable of changing a magnitude of an accumulation capacitance of an electric charge for each pixel includes an acquisition unit configured to acquire an output value according to an accumulated electric charge of each pixel of the sensor, a determination unit configured to determine whether the accumulation capacitance of each pixel is saturated based on the output value, and a setting unit configured to set the magnitude of accumulation capacitance of each pixel according to the determined accumulation capacitance.

Further features and aspects of the present disclosure will become apparent from the following detailed description of exemplary embodiments with reference to the attached drawings.

DESCRIPTION OF THE EMBODIMENTS

Various exemplary embodiments will be described in detail below with reference to the drawings.

Figure 1:
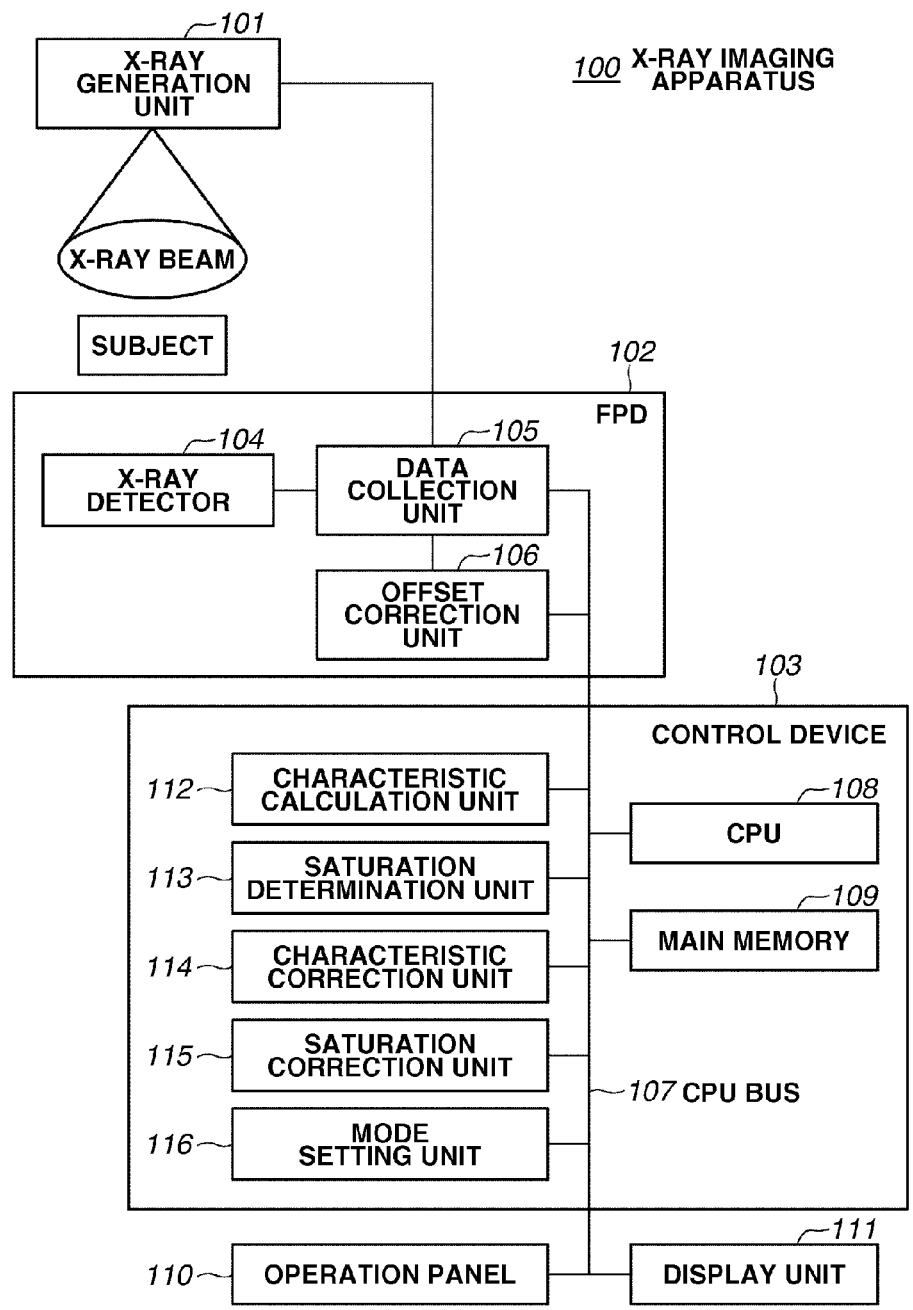
FIG. 1 illustrates an overall configuration of an X-ray imaging apparatus according to a first exemplary embodiment.
Figure 2:
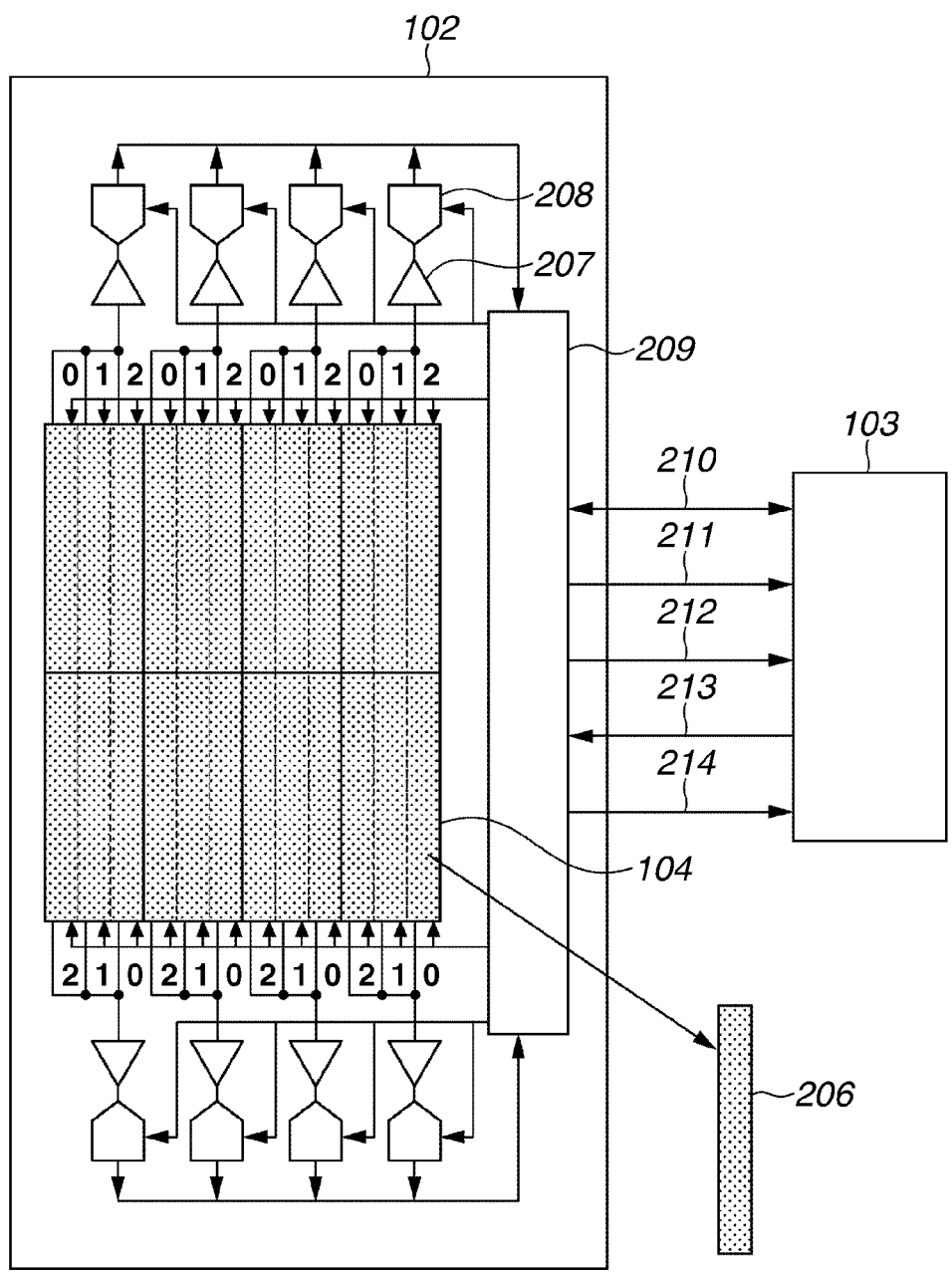
FIG. 2 illustrates a hardware configuration of an X-ray detector.
Figure 3:
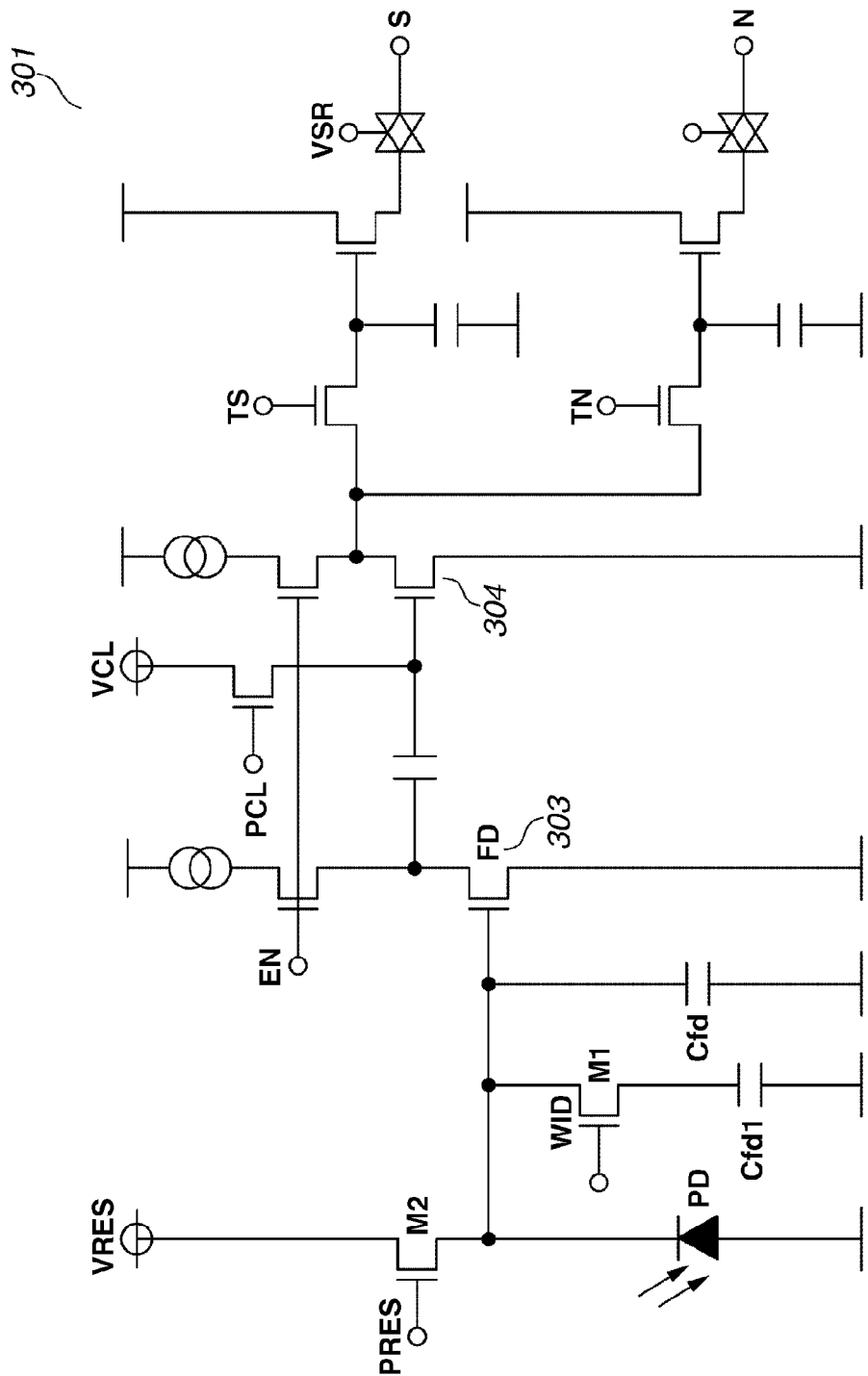
FIG. 3 illustrates a circuit configuration of a pixel of the X-ray detector.

An X-ray imaging apparatus according to a first exemplary embodiment of the present invention will be described with reference to FIG. 1 through FIG. 7. FIG. 1 illustrates an entire configuration of the X-ray imaging apparatus. FIG. 2 illustrates a configuration of an X-ray detector. FIG. 3 illustrates a circuit configuration of a pixel of the X-ray detector.

An X-ray imaging apparatus 100 illustrated in FIG. 1 includes an X-ray generation unit 101, a flat panel detector (FPD) 102, and a control device 103. The X-ray generation unit 101 irradiates a subject with X-ray beams. The FPD 102 receives the X-ray beams (radiation) to acquire digital X-ray image data. The control device 103 forwards the digital X-ray image data to an output unit, such as a display unit 111, a printing unit (not illustrated), a remote location, or the like.

The FPD 102 includes an X-ray detector 104 (radiation sensor), a data collection unit 105, and an offset correction unit 106. The X-ray detector 104 is provided with a phosphorous material for converting X-ray radiation into a visible light, and an image sensor for receiving the visible light and obtaining an analog image signal by photoelectric conversion. Accordingly, the X-ray detector 104 acquires the analog image signal according to two-dimensional intensity distribution of the X-ray emitted by the X-ray generation unit 101.

The analog image signal is converted into a digital image signal, and the data collection unit 105 generates image data from the digital image signal.

The data collection unit 105 supplies the image data to the offset correction unit 106. The offset correction unit 106 corrects an offset variation by subtracting a unique offset to each pixel, which is acquired without irradiating the X-ray detector 104, from the digital image signal. The digital image signal whose offset variation is corrected by the offset correction unit is output as the X-ray image data to the control device 103.

Since the X-ray generation unit 101 continuously generates X-rays, and the X-ray detector 104 outputs signal output values in response to the reception of the X-rays, the X-ray image data is displayed on the display unit 111 as an X-ray moving image. Of course, the X-ray imaging apparatus 100 can capture and display a still image.

Each pixel of the X-ray detector 104 includes two drive modes with different image-capturable X-ray intensity ranges (dose regions). Thus, each pixel can be set in either of two drive modes; that is, a low-dose mode and a high-dose mode. The setting of the drive mode is described below with reference to FIG. 2 and FIG. 3.

The control device 103 includes a central processing unit (CPU) 108, a main memory 109, an operation panel 110, the display unit 111, a characteristic calculation unit 112, a saturation determination unit 113, a characteristic correction unit 114, a saturation correction unit 115, and a mode setting unit 116. Each of these units is connected to each other via a CPU bus 107 so that they can exchange data therebetween. The control device 103 acquires X-ray image data (first frame image data), which is a unity of output values of pixels, by an output acquisition unit (not illustrated), and determines a drive mode of each pixel to be used when the next frame image (second frame image) is captured.

In the X-ray imaging apparatus 100, the main memory 109 stores various types of data necessary for the processing in the CPU 108, and functions as a working memory of the CPU 108. The CPU 108 performs operation control of the entire apparatus in accordance with input from the operation panel 110 using the main memory 109.

The hardware configuration of the FPD 102 will be described based on FIG. 2.

The X-ray detector 104 includes a scintillator (not illustrated) for converting X-ray radiation into a visible light, and a plurality of semiconductor substrates 206 for receiving the visible light to perform photoelectric conversion thereon and outputting an analog signal corresponding to a received light amount. The semiconductor substrate 206 is configured such that a plurality of pixels is arranged on a matrix, and for example, a complementary metal oxide semiconductor (CMOS) image sensor can be used. A differential amplifier 207 receives and amplifies an analog output signal which is output by each pixel of the X-ray detector 104 via a multiplexer. An analog-to-digital (AD) converter 208 converts the analog output signal into a digital output signal.

An imaging control unit 209 combines digital output values converted by the AD converter 208 to obtain X-ray image data. The imaging control unit 209 performs offset correction processing for eliminating differences between dark image data captured in advance and the X-ray image data. The imaging control unit 209 outputs the X-ray image data to the control device 103. In this way, the imaging control unit 209 functions as the data collection unit 105 and the offset correction unit 106 in FIG. 1.

Further, the imaging control unit 209 communicates with the control device 103 to transmit and receive synchronization signals or control commands and controls the FPD 102 in response to a control signal from the control device 103. A command control interface 210 is a communication path for exchanging the control commands. An image data interface 211 is a communication path for transferring images from the imaging control unit 209 to the control device 103.

A ready signal 212 is a signal transmitting from the imaging control unit 209 to inform the control device 103 that the X-ray imaging apparatus 100 is ready for capturing an image. An external synchronization signal 213 is a signal for informing the imaging control unit 209 of a timing of the X-ray irradiation in response to the reception of the ready signal 212 from the imaging control unit 209 by the control device 103. An irradiation permission signal 214 is a signal for indicating that imaging preparation of the X-ray detector 104 is completed. While the irradiation permission signal 214 is enabled, an irradiation signal is transmitted from the control device 103 to the X-ray generation unit 101, and the X-ray is emitted in response to the irradiation signal.

A configuration of a pixel 301 of the above-described X-ray detector 104 will be described with reference to FIG. 3. A photodiode (PD) converts light into an electric current. A floating diffusion capacitor Cfd is a capacitance of a floating diffusion (a floating diffusion region) for accumulating electric charges. A photoelectric conversion element for accumulating electric charges is formed by a photodiode PD, a parasitic capacitance of the photodiode PD, and the floating diffusion capacitor Cfd. A signal voltage according to an accumulation amount of electric charges accumulated in the floating diffusion Cfd is obtained by an amplifier 303.

Thermal noise kTC is removed by a clamping circuit to which a clamping voltage VCL is applied, and the signal voltage is amplified by an amplifier 304. A signal voltage obtained in response to light reception is sampled and held by a photoelectric charge sample-and-hold circuit, and a signal voltage corresponding to a fixed pattern noise is sampled and held by a noise sample-and-hold circuit. The signal voltage is output to the outside via a photoelectric charge signal line and a noise signal line respectively, and the fixed pattern noise due to circuit factors within the sensor can be removed by obtaining a difference between respective outputs of the differential amplifier 207.

A reset switch M2 is a reset metal oxide semiconductor (MOS) transistor (reset circuit) for discharging electric charges accumulated in the floating diffusion Cfd. An EN signal is a signal for controlling power on/off of the amplifiers 303 and 304 to power sources. A PCL signal is a signal for controlling on/off of the clamping voltage VCL to be applied to the clamping circuit. A TS signal and a TN signal are signals for controlling sample and hold to the photoelectric charge sample-and-hold circuits and the noise sample-and-hold circuits, respectively.

The capacitance which accumulates electric charge forms a capacitor, and a signal value corresponding to a ratio of an accumulation amount (magnitude) of an accumulated charge to the capacitance can be obtained. Consequently, as the capacitance is increased, increment of the signal value relative to increment of the amount of the accumulated charge is decreased, thus sensitivity is degraded. However, the amount of the accumulated charge can be increased, and a dynamic range can be increased. When the capacitance is decreased, the dynamic range is decreased, but the sensitivity can be improved.

An accumulation capacitance of a pixel of the X-ray detector 104 can be changed to two steps. A sensitivity switch M1 is a sensitivity changeover MOS transistor for switching between a high dynamic range mode and a high sensitivity mode. An additional capacitance element Cfd1 is an additional capacitance for extending the dynamic range, and when the sensitivity switch M1 is turned on, electric charges can be accumulated. When the sensitivity switch M1 is turned on, a capacitance of a floating node portion is substantially increased, and the sensitivity becomes low but the dynamic range can be extended. Therefore, for example, when performing fluoroscopic photographing requiring the high sensitivity, the imaging control unit 209 turns the sensitivity switch M1 off. Further, at the time of digital subtraction angiography (DSA) imaging requiring the high dynamic range, the imaging control unit 209 turns the sensitivity switch M1 on.

A WID signal is connected to a gate of a sensitivity changeover switch and controls the changeover of sensitivity. When the WID signal is at a low level, the sensitivity changeover switch is turned off and the high sensitivity mode (low-dose mode) suitable for obtaining a signal value of the low dose is set. When the WID signal is at a high level, the sensitivity changeover switch is turned on, and since the dynamic range is extended, the high dynamic range mode (high-dose mode) suitable for receiving the high dose X-ray is set. The WID signal is transmitted to each pixel of the X-ray sensor by the imaging control unit 209. In this respect, the imaging control unit 209 functions as a setting unit of the accumulation capacitance. A signal line which issues the WID signal is led out from each pixel, and is connected to a control unit within the imaging control unit 209 which issues a control signal. Accordingly, the WID signal can be variable for each pixel.

In this way, an accumulation capacitance for accumulating charges produced in response to the light reception by the photodiode is variable in each pixel of the X-ray detector 104. When the accumulation capacitance is set to a larger level, the dynamic range of pixel can be increased. When the accumulation capacitance is set to a smaller level, the sensitivity of pixel can be decreased. The control device 103 makes the accumulation capacitance larger when an output value of the X-ray detector 104 is larger than a criterion, and makes the accumulation capacitance smaller when an output value is smaller than the criterion. By adaptively changing the accumulation capacitance of each pixel in this way, the sensitivity can be increased in the entire image while reducing overexposure or saturation.

However, when the accumulation capacitance is changed for each pixel, resultant output values are different if radiations with the same radiation dose are emitted. Thus, when one image is generated from a plurality of pixels having different accumulation capacitances, correction of input/output characteristics may be necessary.

Thus, the processing executed by the X-ray imaging apparatus 100 will be described below. One of the processing to be executed is an operation of performing imaging for calibration and calculating input/output characteristics and a saturation level of each pixel (hereinafter, referred to as a calibration operation), which is an operation characteristic to the present exemplary embodiment.

Another processing is an operation of correcting a variation in the input/output characteristics of repeatedly captured images of a subject and determining a drive mode of the next frame for each pixel based on an image of a predetermined frame (hereinafter, referred to as an imaging operation).

Figure 4:
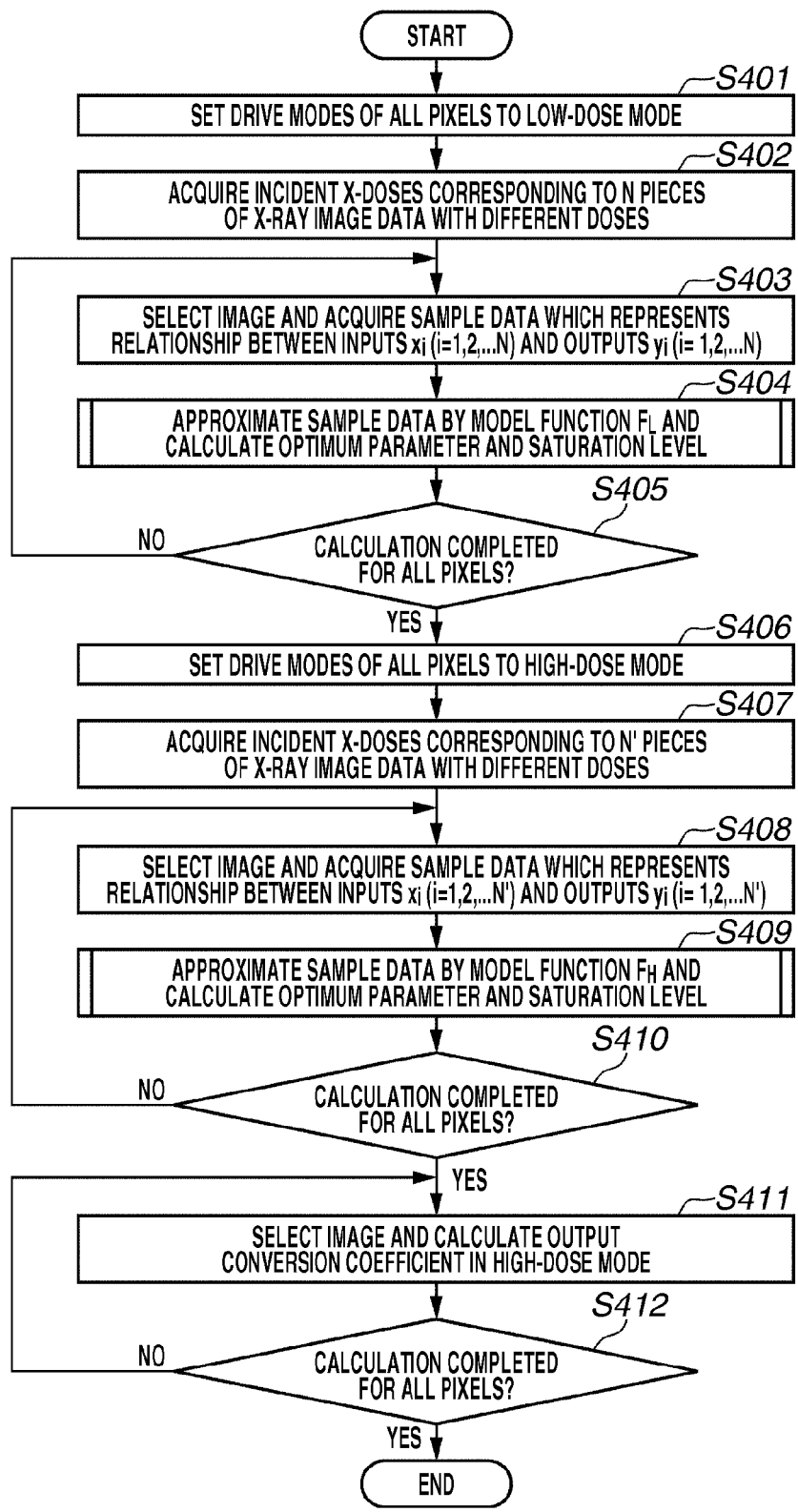
FIG. 4 is a flowchart illustrating a processing procedure of a calibration operation.
Figure 5:
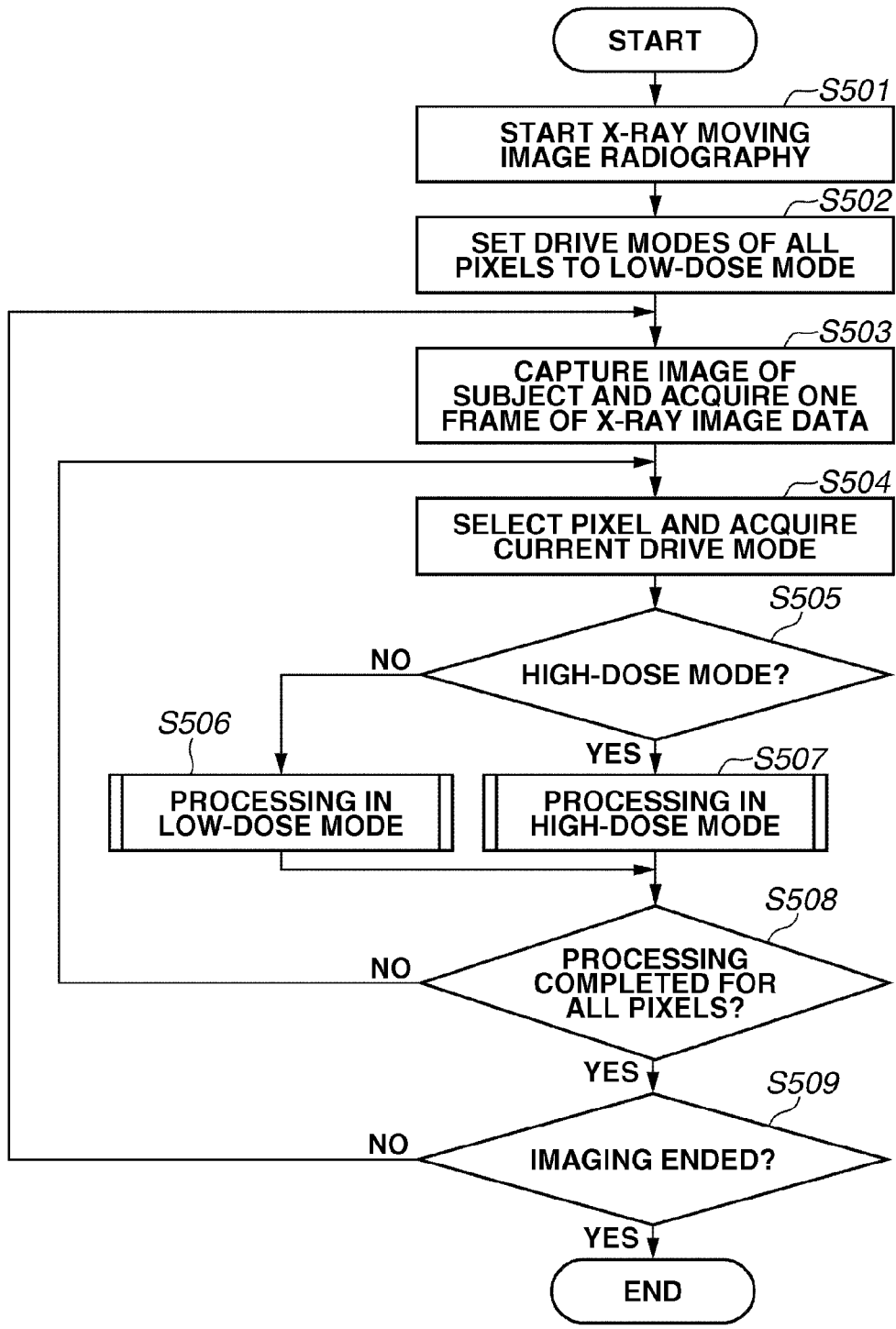
FIG. 5 is a flowchart illustrating a processing procedure of an imaging operation.
Figure 6:
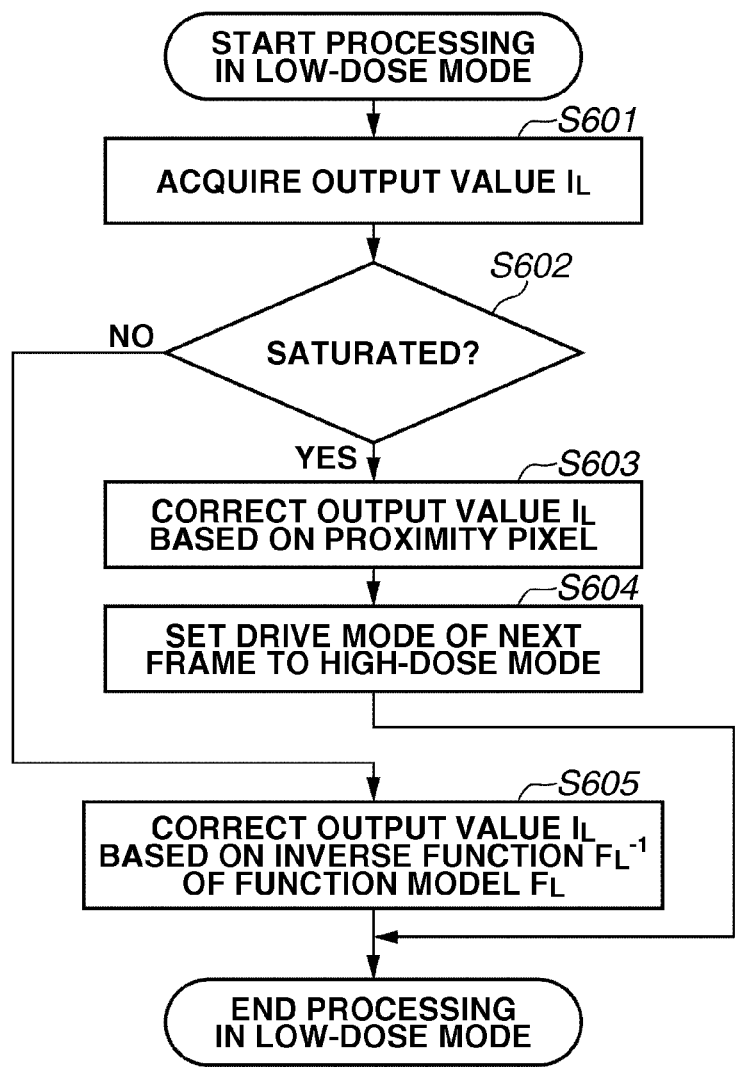
FIG. 6 is a flowchart illustrating processing procedure on a pixel in a low-dose mode.
Figure 7:
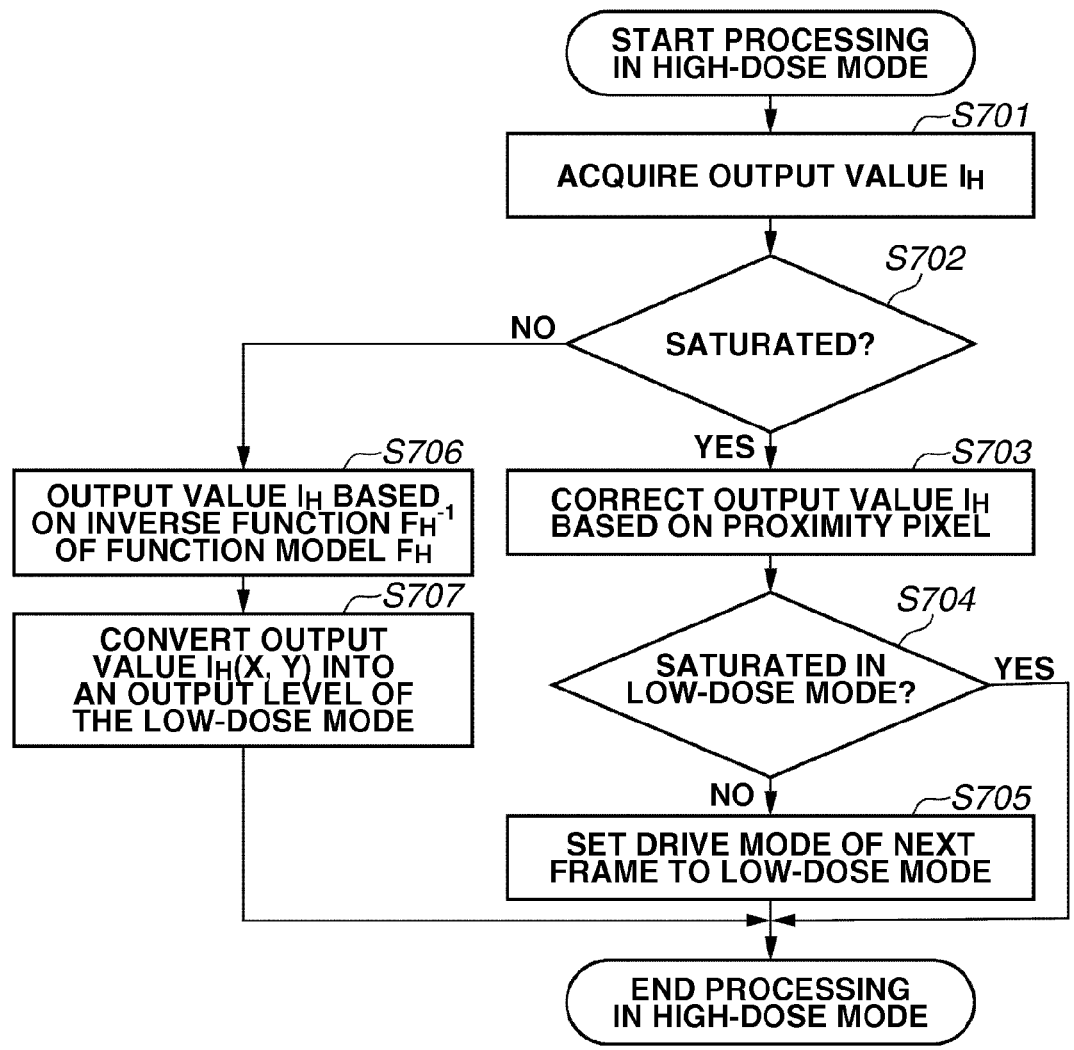
FIG. 7 is a flowchart illustrating processing procedure on a pixel in a high-dose mode.

FIG. 4 illustrates a flow of the calibration operation. FIG. 5 illustrates a flow of the imaging operation. FIG. 6 illustrates a processing flow of a pixel in a low-dose mode in the imaging operation. FIG. 7 illustrates a processing flow of a pixel in a high-dose mode in the imaging operation.

<Calibration Operation>

The calibration operation of the X-ray imaging apparatus 100 in FIG. 1 will be specifically described with reference to the flowchart illustrated in FIG. 4. First, when the FPD 102 starts the calibration operation according to an operator's instruction via the operation panel 110, in step S401, the data collection unit 105 (the imaging control unit 209) sets the drive modes of all pixels of the X-ray detector 104 to the low-dose mode. This operation corresponds to enable the additional capacitance element Cfd1 to accumulate electric charges by setting the WID signals of all pixels to the low level.

In step S402, the calibration imaging is performed according to the instruction that the control device 103 acquires via the operation panel 110. The calibration imaging refers to an imaging operation for acquiring an image by emitting X-rays without placing a subject between the FPD 102 and the X-ray generation unit 101. At this time, the imaging operation is performed a plurality of times with varying intensities of the X-ray beam emitted from the X-ray generation unit 101 under the control of the CPU 108. In addition, an incident X-ray dose to the X-ray detector 104 for each imaging operation is measured by a dosimeter (not illustrated). The imaging data is stored in the main memory 109 in association with the measured incident X-ray doses as the X-ray image data, after an offset variation is corrected by the offset correction unit 106.

Figure 16:
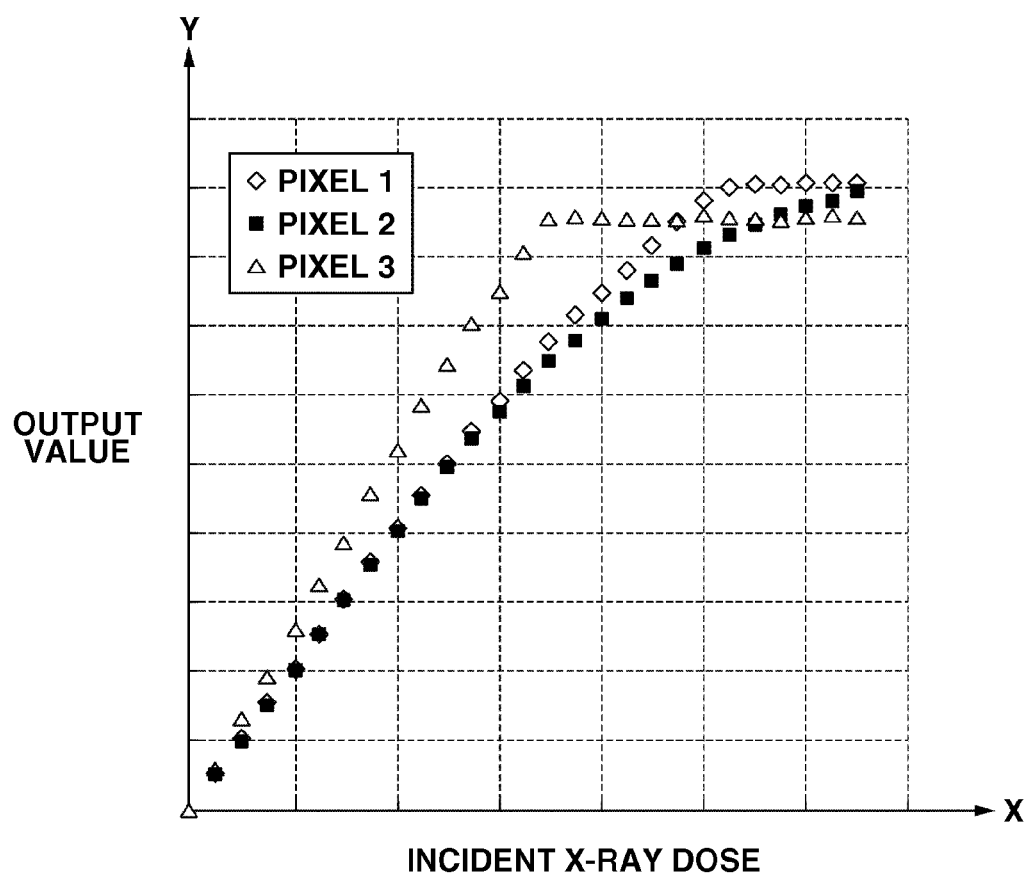
FIG. 16 illustrates input/output characteristics of each pixel.

Based on recorded data, data indicating a relationship of an output value of each pixel with respect to an incident dose as illustrated in FIG. 16 is obtained, and the data is regarded as the data indicating input/output characteristics of each pixel. FIG. 16 is a graph indicating an output value (Y) of a pixel corresponding to an incident X-ray dose (X), and illustrates the respective input/output characteristics for pixels 1, 2, and 3. In the present exemplary embodiment, the incident X-ray dose is measured by a dosimeter. However, the present exemplary embodiment is not limited this configuration. The incident X-ray dose may be estimated from imaging conditions and X-ray image data.

Next, the characteristic calculation unit 112 changes accumulation capacitances and calculates input/output characteristics of pixels with respect to the respective accumulation capacitances by executing the processing in steps S403 through S405.

In step S403, the characteristic calculation unit 112 acquires the incident X-ray doses $\{x_i|i=1, 2 \ldots N$ and $x_i < x_{i+1}\}$, and output values $\{y_i|i=1, 2 \ldots N\}$ for an arbitrary pixel corresponding to xi, as sample data indicating the input/output characteristics of each pixel. Where, an output value of each pixel of the X-ray detector 104 is assumed to be a pixel value on a corresponding position in image data. The pixel value of the image data is supposed to an output value of each pixel plus dark correction, and is handled as the output value of each pixel.

Next in step S404, the characteristic calculation unit 112 calculates optimum parameters and the saturation level of the pixel for approximating the input/output characteristics of the pixel by a function model $F_L$ based on the acquired sample data, and stores them in the main memory 109. In the present exemplary embodiment, for example, a composite function expressed by the following equation (1) is used as the function model $F_L$.

$$F_L(x) = \begin{cases} A_L x & x < T_{L0} \\ B_L(x-T_{L0})^2 + C_L(x-T_{L0}) + A_L T_{L0} & T_{L0} \leq x < T_{L1} \\ B_L(T_{L1}-T_{L0})^2 + C_L(T_{L1}-T_{L0}) + A_L T_{L0} & x > T_{L1} \end{cases} \quad (1)$$

In the equation (1), when x is less than $T_{L0}$, a primary expression is used to model a dose region where input/output characteristics can be linearly approximated. When x is $T_{L0}$ or more and less than $T_{L1}$, a secondary expression is used to model a dose region where input/output characteristics can be nonlinearly approximated. Further, when x exceeds $T_{L1}$, a constant value is set to model a dose region which reaches a saturation level.

In the above equation (1), $A_L$, $B_L$, $C_L$, $T_{L0}$, and $T_{L1}$ are unknown parameters, and it is only necessary to determine the optimum parameters appropriately approximating the sample data acquired in step S403, that is, the incident X-ray doses $x_i$ and the corresponding output values $y_i$. A known method can be used for determining optimum values of the unknown parameters according to the least square criterion in a linear algebraic manner from many pieces of the sample data.

The saturation level $S_L$ is an output value of a pixel when the incident X-ray dose x exceeds $T_{L1}$, and can be calculated by the following equation (2).

$$S_L = B_L(T_{L1}-T_{L0})^2 + C_L(T_{L1}-T_{L0}) + A_L T_{L0} \quad (2)$$

Figure 17:
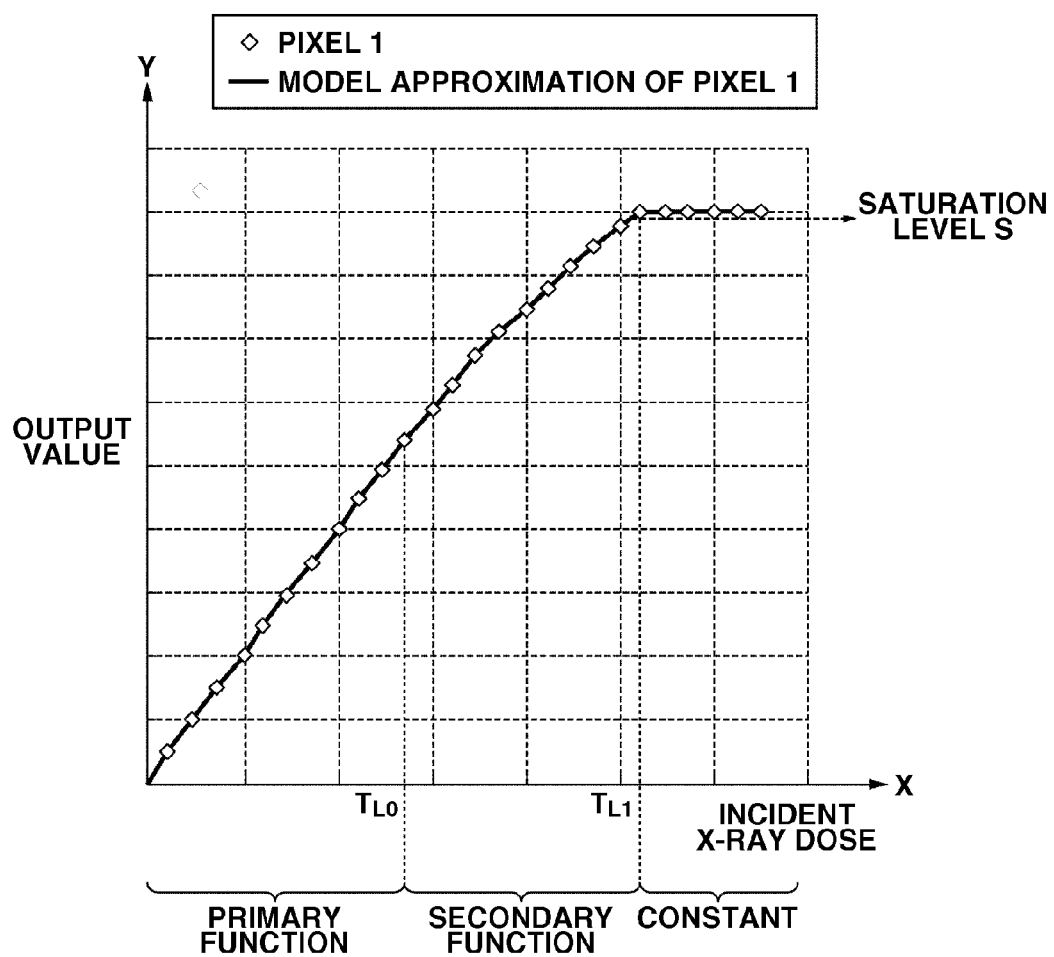
FIG. 17 illustrates calculation results of model approximation of input/output characteristics and a saturation level.

The characteristic calculation unit 112 repeatedly executes operations of the above-described processing in steps S403 and S404 until the operations are completed for all pixels in step S405. Thus, the characteristic calculation unit 112 calculates a model approximation by the optimum parameter and the saturation level $S_L$ of each pixel as illustrated in FIG. 17, and completes the calibration operation in the low-dose mode. FIG. 17 is a graph indicating a relationship of the output value (Y) with respect to the incident dose (X) for the pixel 1. In FIG. 17, actually measured values for the pixel 1 and a graph for the model approximation performed using the equation 1 are illustrated.

Alternatively, the model approximation may be performed using a cubic function or the like without limiting the method as described above.

Then, in steps S406 through S410, when the drive mode is the high-dose mode, the characteristic calculation unit 112 performs calibration operations, and calculates the optimum parameters $A_H$, $B_H$, $C_H$, $T_{H0}$, and $T_{H1}$, and the saturation level $S_H$ for each pixel. In step S406, the data collection unit 105 sets the drive mode of all pixels of the X-ray detector 104 to the high-dose mode. The processing in the subsequent steps is similar to the above-described steps S402 through S405 in the low-dose mode, and therefore redundant descriptions will be omitted.

In this way, the characteristic calculation unit 112 calculates the optimum parameters and the saturation level which approximate the input/output characteristics of each pixel with respect to each drive mode, i.e., accumulation capacitance.

At the end of the calibration operations in steps S411 and S412, the characteristic calculation unit 112 calculates an output conversion coefficient $R_{HL}$ for converting an output value in the high-dose mode into an output level in the low-dose mode for each pixel. According to the present exemplary embodiment, the output conversion coefficient $R_{HL}$ is calculated by the following equation (3) for each pixel, using the optimum parameters $A_L$ and $A_H$ in a dose region where the input/output characteristics are linear in the low-dose mode and the high-dose mode.

$$R_{HL} = A_L/A_H \quad (3)$$

Through the above-described processing, the optimum parameters $A_L$, $B_L$, $C_L$, $T_{L0}$, and $T_{L1}$ and the saturation level $S_L$ when the drive mode is the low-dose mode, the optimum parameters $A_H$, $B_H$, $C_H$, $T_{H0}$, and $T_{H1}$ and the saturation level $S_H$ in the high-dose mode, the output conversion coefficient $R_{HL}$ of the high-dose mode can be respectively calculated for each pixel. Accordingly, the calibration operation is completed.

According to the above-described calibration operation, a correspondence relationship of the output values of pixels with different accumulation capacitances can be comprehended. Even when the same dose is emitted to pixels with different accumulation capacitances, the output values are varied, however the correspondence relationship can be obtained by the above-described output conversion coefficients. Therefore, the X-ray image data can be generated as the entire correction by correcting the output values of pixels of either one of the high-dose mode and the low-dose mode using the output conversion coefficients.

The reason for obtaining input/output characteristics for each pixel is that input/output characteristics are different for each pixel. By obtaining input/output characteristics for each drive mode for each pixel, difference in the modes can be corrected for each pixel.

<Imaging Operation>

Next, the imaging operation of the X-ray imaging apparatus 100 in FIG. 1 will be described with reference to the flowcharts illustrated in FIG. 5 through FIG. 7. In the imaging operation, the X-ray imaging apparatus 100 performs operations for correcting a variation in the input/output characteristics of a captured image of a subject based on the input/output characteristics and the saturation level for each pixel, which are acquired by the above-described calibration operation, and determining a drive mode of the next frame for each pixel.

First, the flow of the entire imaging operation will be described with reference to the flowchart illustrated in FIG. 5. It is assumed that an operator puts a subject to an appropriate position relative to the X-ray detector 104. The CPU 108 in the control device 103 sets imaging conditions based on information input via the operation panel 110 in this state. In step S501, the CPU 108 instructs the X-ray generation unit 101 and the FPD 102 to start X-ray moving image radiography according to an imaging instruction.

Immediately after the start of the X-ray moving image radiography, in step S502, the imaging control unit 209 (the data collection unit 105) sets the drive modes of all pixels to the low-dose mode according to an instruction from the mode setting unit 116 in the control device 103. Accordingly, since a contrast of an image can be improved if a dose is low, there is an effect that can reduce an exposure amount of the subject while causing the operator to increase the dose at the minimum.

In a case where the imaging operation is known to require a high dose such as DSA or the like in advance, the drive mode of a pixel immediately after the start of imaging can be set to the high-dose mode based on the imaging conditions which are input to execute the DSA imaging. Accordingly, saturation of the pixel immediately after the start of imaging can be reduced, and an image which is easy to observe can be obtained soon after the imaging.

In the X-ray moving image radiography, the X-ray generation unit 101 emits X-ray beams successively, or intermittently (in pulses) according to the control of the CPU 108. The X-ray beam passes through the subject while attenuating and reaches the X-ray detector 104. In step S503, the imaged data is temporarily stored in the main memory as one frame of the X-ray image data according to the control of the CPU 108, after an offset variation therein is corrected as described above. In the present exemplary embodiment, the subject is a human body. In other words, the X-ray image data output from the X-ray detector 104 is image data of a human body.

Next, in step S504, the CPU 108 selects one pixel in the image data, and acquires a drive mode currently set to a pixel of the sensor corresponding to one pixel in the image from the data collection unit 105. Hereinbelow, the selected pixel in the image will be described as a target pixel. The drive mode of each pixel may be stored in a memory in the control device 103.

In step S505, the CPU 108 determines whether a drive mode of the target pixel is the high-dose mode. According to a determination result in step S505, the CPU 108 performs either of processing in the low-dose mode (in step S506) and processing in the high-dose mode (in step S507). The processing in the respective steps includes correction processing of input/output characteristics, correction processing of saturated pixels, and change processing of the drive modes, namely the accumulation capacitances. The details of the processing in steps S506 and S507 will be described below.

The CPU 108 repeatedly performs the above-described processing in steps S504 through S507 until it is determined in step S508 that all pixels included in one frame of the X-ray image data are processed. Further, in step S509, the CPU 108 repeats the above-described processing in steps S503 through S508 until an imaging end instruction is issued each time an image is captured, and successively processes one frame of sequentially acquired X-ray image data, so that the imaging operation is continuously performed.

The processing on a pixel in the low-dose mode in the above-described step S506 will be specifically described with reference to the flowchart illustrated in FIG. 6.

First, in step S601, the saturation determination unit 113 acquires an output value $I_L(x, y)$ (corresponding to the above-described yi) of the pixel. The output value here is a pixel value of the target pixel. Next in step S602, the saturation determination unit 113 determines whether a pixel of the sensor corresponding to the target pixel is saturated. In this case, the saturation determination unit 113 determines as the pixel is saturated if the conditions of the following equation (4) are satisfied based on an output value $I_L(x, y)$ of the target pixel (x, y) in the captured X-ray image data and the saturation level $S_L(x, y)$ of the pixel of the sensor corresponding to the target pixel.

$$I_L(x,y) \geq k S_L(x,y) \quad (4)$$

Where, a coefficient k is a parameter for setting a margin to the saturation level $S_L(x, y)$, and a value of one or less is set to the coefficient k. Generally, an output value of a saturated pixel is a constant value, but some variations occur. Therefore, the coefficient k is empirically set in consideration of such variations. In the present exemplary embodiment, the coefficient k is 0.95.

Next, in step S603, the saturation correction unit 115 corrects the output value $I_L(x, y)$ for the target pixel (x, y) corresponding to the pixel determined as the saturated pixel. In this case, correction is performed using proximity pixels which are highly correlated with the target pixel. More specifically, for example, a pixel block composed of five by five pixels centering on the target pixel is formed, and a mean value within the block is taken as a corrected output value of the target pixel. At this time, it is assumed that determination equivalent to the above-described processing in step S601 is performed on each pixel within the formed pixel block, and a mean value of the pixel values corresponding to the pixels excluding the saturated pixels is calculated.

In step S604, the mode setting unit 116 sets the drive mode of the next frame to the high-dose mode for the target pixel (x, y) corresponding to the pixel determined as the saturated pixel. By this control, the pixel of the sensor, which has been saturated due to an excessive X-ray dose in the current low-dose mode, can be prevented from being saturated by the similar level of X-ray dose in the next frame.

On the other hand, with respect to the target pixel (x, y) of the image corresponding to the pixel determined as the unsaturated pixel in the above-described processing in step S602 (NO in step S602), in step S605, the characteristic correction unit 114 corrects the input/output characteristics of the output value $I_L(x, y)$. More specifically, the characteristic correction unit 114 corrects the output value $I_L(x, y)$ of the target pixel using an inverse function $F_L^{-1}$ of the function model $F_L$ which is algebraically obtained by the following equation (5) based on the optimum parameters $A_L(x, y)$, $B_L(x, y)$, and $C_L(x, y)$, and the threshold values $T_{L0}(x, y)$ and $T_{L1}(x, y)$ corresponding to the target pixel.

$$F_L^{-1}(v) = \begin{cases} v/A_L & v < A_L T_{L0} \\ T_{L0} - \dfrac{C_L}{2B_L} + \sqrt{\dfrac{v - A_L T_{L0}}{B_L} + \dfrac{C_L^2}{4B_L^2}} & v \geq A_L T_{L0} \text{ and } B_L > 0 \\ T_{L0} - \dfrac{C_L}{2B_L} - \sqrt{\dfrac{v - A_L T_{L0}}{B_L} + \dfrac{C_L^2}{4B_L^2}} & v \geq A_L T_{L0} \text{ and } B_L < 0 \end{cases} \quad (5)$$

Accordingly, an output value of each pixel is corrected to a dose equivalent value which is not affected by a variation of the input/output characteristics of the pixel. According to the present exemplary embodiment, the inverse function is algebraically calculated, but it is not limited thereto. The values may be analytically obtained using the direct search method (e.g., the bisection method and the linear inverse interpolation method) and the successive approximation method (e.g., the Newton-Raphson method and the Bailey method).

The processing on pixel in the high-dose mode in the above-described step S507 will be specifically described with reference to the flowchart illustrated in FIG. 7.

First, in steps S701 and S702, the saturation determination unit 113 acquires an output value of the target pixel, and determines whether a pixel of a sensor corresponding to the target pixel is saturated. The determination method is similar to the processing in steps S601 and S602 in the low-dose mode, and therefore redundant descriptions will be omitted.

Next, if it is determined that the pixel is saturated (YES in step S702), in step S703, the saturation correction unit 115 corrects an output value $I_H(x, y)$. The correction method is similar to the processing in step S603 in the low-dose mode, and therefore redundant descriptions will be omitted.

In step S704, with respect to the target pixel (x, y) corresponding to the pixel determined as the saturated pixel, the saturation determination unit 113 determines whether a pixel corresponding to the target pixel is saturated if it is set to the low-dose. The determination method is similar to the processing in steps S601 and S602, however, the saturation level $S_L(x, y)$ is used in the determination in place of the saturation level $S_H(x, y)$.

If it is determined that the pixel is not saturated in an output level of the low-dose mode (NO in step S704), in step S705, the mode setting unit 116 determines the drive mode of the next frame of the pixel corresponding to the target pixel as the low-dose mode. According to the determination, the mode setting unit 116 instructs the imaging control unit 209 (the data collection unit 105) to decrease the accumulation capacitance. Accordingly, the imaging control unit 209 sets the WID signal to a low level, and turns off a switch which connects in parallel the additional capacitance element Cfd1 and the photoelectric conversion element. Accordingly, the drive mode is set to the low-dose mode. According to the above-described processing, with respect to a pixel in which a signal-to-noise (S/N) ratio is deteriorated due to an insufficient X-ray dose in the high-dose mode, it is expected that the S/N ratio can be improved even with the similar level of the X-ray dose in the next frame. On the other hand, if it is determined that the pixel is saturated in the output level of the low-dose mode (YES in step S704), the mode setting unit 116 determines not to change the drive mode to the low-dose mode or to maintain the high-dose mode.

On the other hand, if it is determined that the pixel is not saturated (NO in step S702), in step S706, the characteristic correction unit 114 corrects the input/output characteristics of the output value $I_H(x, y)$. The correction method is similar to that in the low-dose mode. The characteristic correction unit 114 corrects the output value $I_H(x, y)$ of the target pixel by the inverse function $F_H^{-1}$ of the function model $F_H$ based on the optimum parameters $A_H(x, y)$, $B_H(x, y)$, and $C_H(x, y)$, and the threshold values $T_{H0}(x, y)$ and $T_{H1}(x, y)$ corresponding to the target pixel. The detail is similar to the processing in step S605 in the low-dose mode, and therefore redundant descriptions will be omitted.

If the pixel is not saturated (NO in step S702), in step S707, the characteristics correction unit 114 converts the output value $I_H(x, y)$ into an output level of the low-dose mode. In this case, the conversion is performed using the following equation (6) based on the output value $I_H(x, y)$ of the target pixel and an output conversion coefficient $R_{HL}(x, y)$ corresponding to the target pixel.

$$I'_H(x,y) = R_{HL}(x,y) I_H(x,y) \quad (6)$$

According to the above-described processing, all pixels included in one frame of the X-ray image data can be unified to the output level when the drive mode is the high-dose mode and is converted into a dose equivalent value which is not affected by the input/output characteristics and the drive mode of each pixel.

According to the above-described first exemplary embodiment, the input/output characteristics and the saturation level of each pixel are calculated, a variation of the input/output characteristics of an captured image of the subject is corrected, and the drive mode of the next frame is determined for each pixel. Thus, the sensitivity can be improved while reducing saturation of a pixel according to a received light amount (radiation dose) of each pixel, and an image with appropriate image quality can be obtained. Therefore, if an imaging target itself has a wide dynamic range, a kinetic study or three dimensional (3D) imaging can be appropriately performed.

In a second exemplary embodiment, three drive modes with different dose regions, namely accumulation capacitances are provided, and the accumulation capacitances can be changed in three steps. In addition, processing for dealing with a defect pixel which occurs in an image sensor can be performed.

The general outline of the present exemplary embodiment will be described with reference to FIG. 8 through FIG. 14, and FIG. 18.

Figure 8:
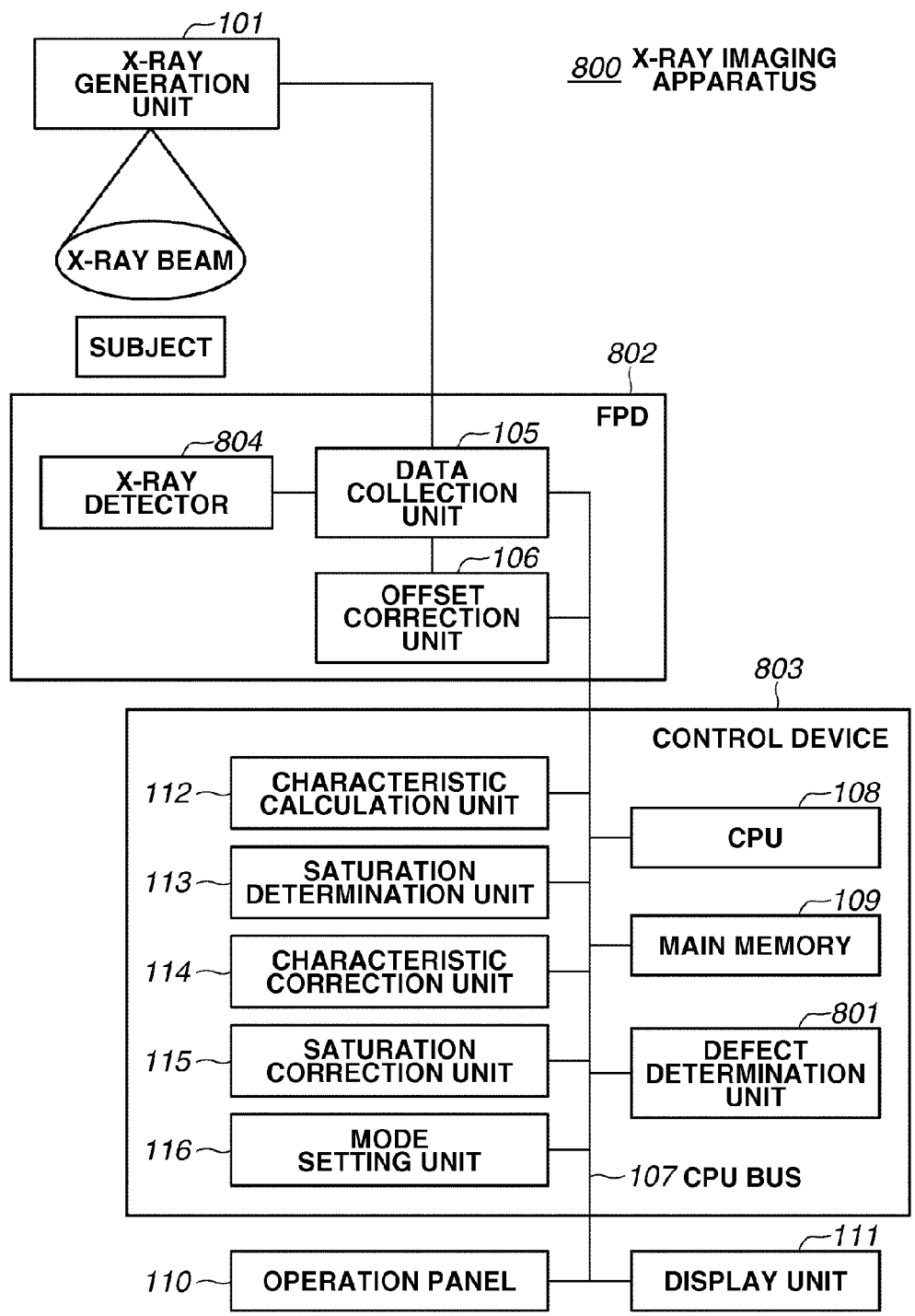
FIG. 8 is an overall configuration diagram of the X-ray imaging apparatus according to a second exemplary embodiment

The configuration of an X-ray imaging apparatus 800 will be described based on FIG. 8. A configuration of pixels in an image sensor of an X-ray detector 804 in an FPD 802 is different.

A control device 803 in the X-ray imaging apparatus 800 includes a defect determination unit 801, which acquires position information of a defect pixel for each drive mode to store the position information in the main memory 109 and determines whether the pixel is a defect pixel based on image data. In this respect, the defect determination unit 801 also serves as a defect acquisition unit. When the defect determination unit 801 determines the pixel as the defect pixel, mode determination processing is omitted, so that processing time taken for a pixel can be reduced as a whole.

Figure 9:
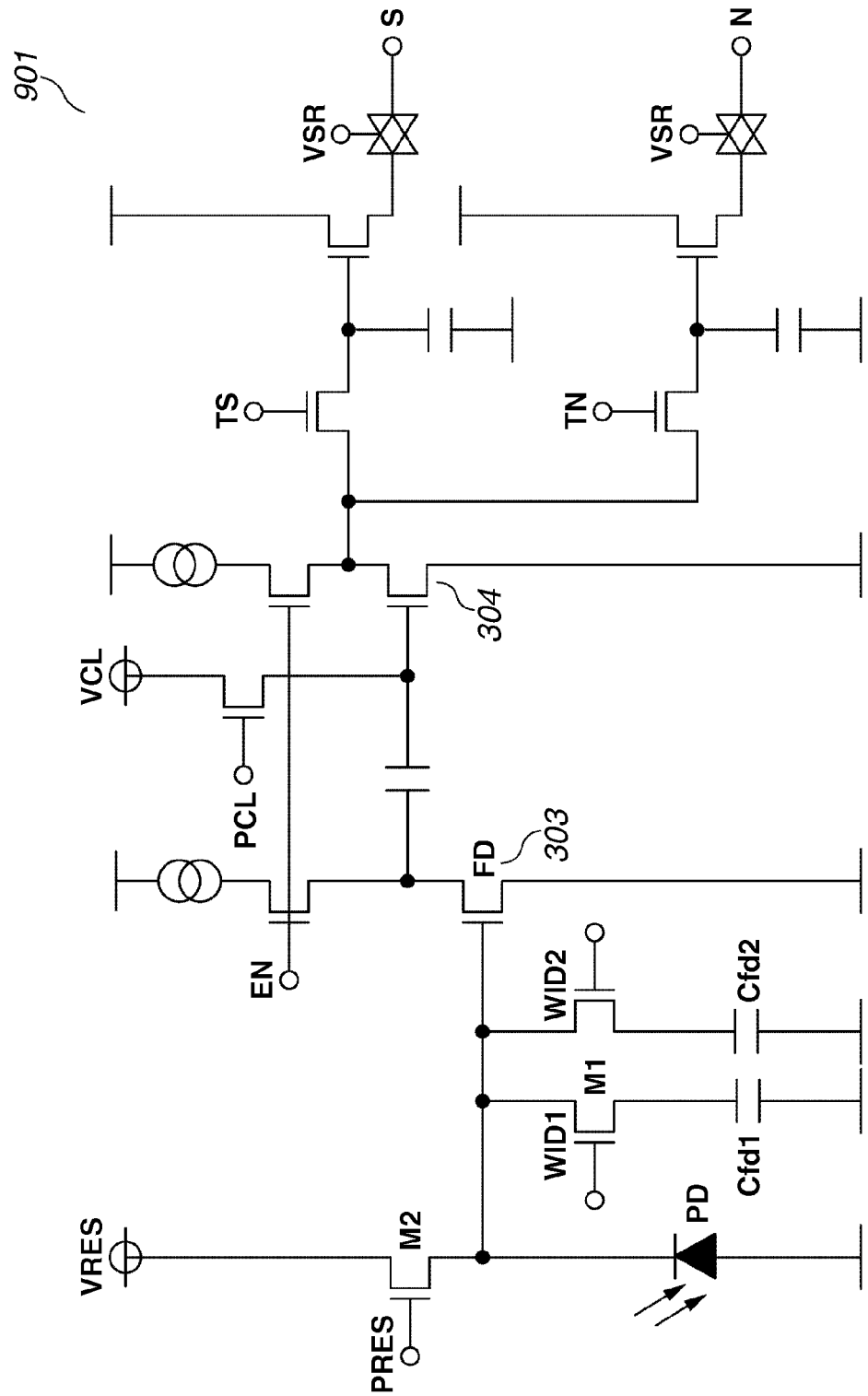
FIG. 9 illustrates an outline of an equivalent circuit of a pixel.

A pixel in the image sensor of the X-ray detector 804 will be described based on FIG. 9. Each pixel 901 includes accumulation capacitance elements Cfd1 and Cfd2, which are respectively connected in parallel with the photoelectric conversion element PD via the switch element. The accumulation capacitance element Cfd1 has a smaller capacitance than that of the accumulation capacitance element Cfd2. A signal WID1 and a signal WID2 are signals for controlling on/off of respective switch elements connected to the accumulation capacitance elements Cfd1 and Cfd2. Mode settings are changed by the signal WID1 and the signal WID2. The imaging control unit 209 in the FPD 802 sets the signal WID1 to high, and the WID2 to low, so that only the accumulation capacitance element Cfd1 is set to a connection state and the accumulation capacitance element Cfd2 is set to a non-connection state. Accordingly, the pixel is set to the low-dose mode. Conversely, by setting the accumulation capacitance element Cfd1 to the non-connection state and setting only the accumulation capacitance element Cfd2 to the connection state, the pixel is set to the middle-dose mode. Further, by setting both the accumulation capacitance elements Cfd1 and Cfd2 to the connection state, the pixel is set to the high-dose mode.

In addition, the defect determination unit 801 in the control device 803 generates a defect map for each drive mode. Further, the defect determination unit 801 determines whether each pixel is defective from the generated defect map and pixel values of the X-ray image data. From the fact that the accumulation capacitances in the circuit to be used are different according to the drive modes, there is an issue that a number of defect pixels and positions thereof change for each drive mode. To cope with the issue, by generating the defect map for each drive mode, processing corresponding to defect pixels different for each drive mode can be executed, and deterioration of the image quality resulting from the defect pixel can be suppressed. If a difference in circuit elements to be used in each drive mode is negligible, it is only necessary to generate one defect map for the X-ray detector 804 regardless of the drive modes.

The configuration of the X-ray imaging apparatus according to the present exemplary embodiment is similar to that in the first exemplary embodiment, and therefore redundant descriptions will be omitted.

The calibration operation and the imaging operation controlled by the CPU 108 in the above-described X-ray imaging apparatus 800 are different from those in the first exemplary embodiment, and hereinafter descriptions will be made with reference to FIG. 10 through FIG. 14, and FIG. 18. In the X-ray imaging apparatus 800 illustrated in FIG. 8, units that operate in the similar manner to those in the X-ray imaging apparatus 100 illustrated in FIG. 1 are denoted by the same reference numerals, and therefore redundant descriptions will be omitted. Further, in the flowcharts illustrated in FIG. 10 through FIG. 14, the steps in which the processing is performed in the similar manner to those in the flowcharts illustrated in FIG. 4 through FIG. 7 in the first exemplary embodiment are denoted by the same reference numerals. Configurations which are different from the above-described first exemplary embodiment are described below.

<Calibration Operation>

Figure 10:
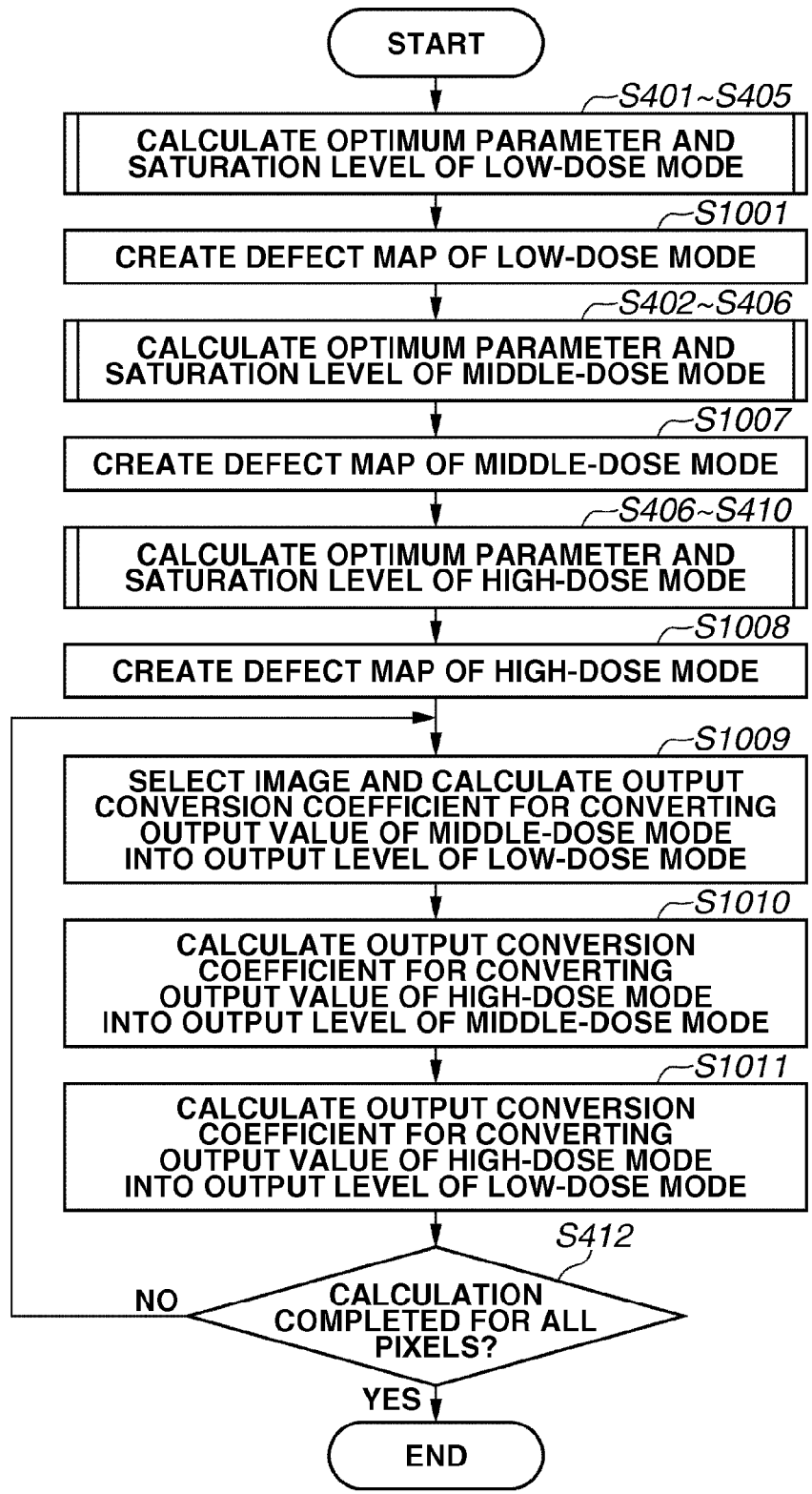
FIG. 10 is a flowchart illustrating a processing procedure of a calibration operation according to a second exemplary embodiment.

In accordance with the flowchart in FIG. 10, a processing procedure of the calibration operation according to the present exemplary embodiment will be described. First, the control device 803 starts the calibration operation according to an operator's instruction via the operation panel 110. Similar to the first exemplary embodiment, in steps S401 through S405, the mode setting unit 116 performs determination to set the drive mode to the low-dose mode, and the imaging control unit 209 sets the drive mode of all pixels to the low-dose mode. Further, imaging operations are performed for a plurality of times with varying intensities of the X-ray beams, and the characteristic calculation unit 112 calculates the optimum parameters $A_L$, $B_L$, $C_L$, $T_{L0}$, and $T_{L1}$ and the saturation level $S_H$ in the low-dose mode for each pixel.

Next in step S1001, as characteristic processing according to the present exemplary embodiment, the defect determination unit 801 generates and stores a defect map $D_L$ in the low-dose mode. The defect pixel is a pixel in which an output with respect to an incident dose does not change, or a pixel in which modeling of input/output characteristics cannot be performed. The defect map is one which stores flags for distinguishing a normal pixel from a defect pixel for each pixel, and in the present exemplary embodiment, it is assumed that the defect map stores zero for a normal pixel, and one for a defect pixel.

Figure 18:
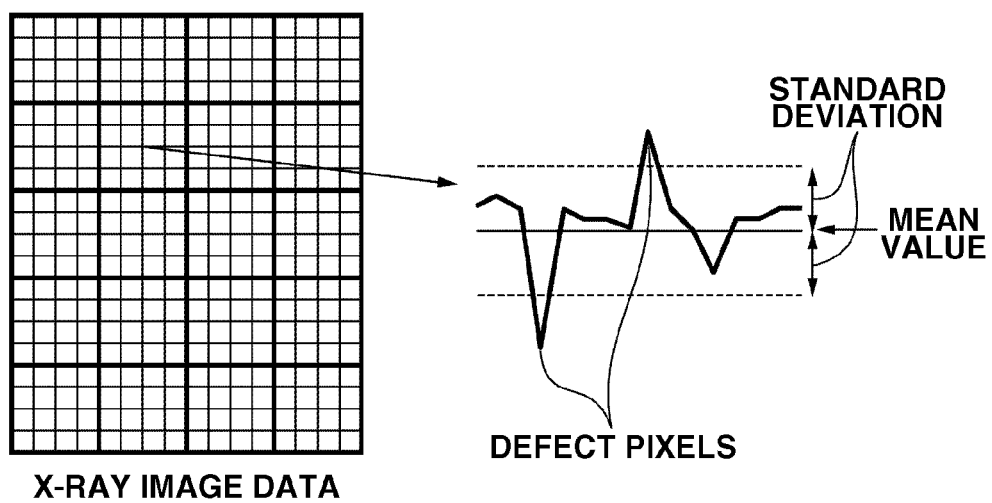
FIG. 18 illustrates extraction of defect pixels.

The defect determination unit 801 uses, for example, a method illustrated in FIG. 18. On a left part in FIG. 18, a state in which white image data obtained by irradiating the X-ray without an object is divided into pixel blocks in a proper size is illustrated. On a right part in FIG. 18, a graph indicating a spatial change of a pixel value is illustrated. In the graph, a horizontal axis expresses a position in the block, and a vertical axis expresses a pixel value. A mean value and a standard deviation in the block are determined, a pixel whose pixel value does not fall within a range of a mean value±(n×standard deviation) is determined as a defect pixel, where "n" is a specified value. In addition, a known method for determining a defect pixel can be utilized.

Subsequently, in steps S402 through S406, S1007, S406 through S410, and S1008, the control device 803 performs the calibration operations when the drive mode is the middle-dose mode and in the high-dose mode, and the characteristic calculation unit 112 calculates the optimum parameters, the saturation level, and defect map for each pixel in the middle-dose mode and the high-dose mode. The processing in these steps is similar to those in the S601 through S605, and S1001 in the low-dose mode, and therefore redundant descriptions will be omitted.

Finally, in steps S1009, S1010, and S1011, the mode setting unit 116 calculates an output conversion coefficient $R_{ML}$ for converting an output value of the middle-dose mode into an output level of the low-dose mode, an output conversion coefficient $R_{HM}$ for converting an output value of the high-dose mode into an output level of the middle-dose mode, and an output conversion coefficient $R_{HL}$ for converting an output value of the high-dose mode into an output level of the low-dose mode for each pixel according to the following equation (7).

$$R_{ML}=A_L/A_M$$

$$R_{HM}=A_M/A_H$$

$$R_{HL}=A_L/A_H \qquad (7)$$

According to the above-described processing, the mode setting unit 116 can calculate the optimum parameters, the saturation level, and the defect map when the drive mode is the low-dose mode, the middle-dose mode, and the high-dose mode, and further an output conversion coefficient when the drive mode is the middle-dose mode and the high-dose mode for each pixel.

<Imaging Operation>

Next, an imaging operation by the X-ray imaging apparatus 800 in FIG. 8 will be described with reference to the flowcharts illustrated in FIG. 11 through FIG. 14. In the imaging operation, the X-ray imaging apparatus 800 performs operations for correcting a variation in the input/output characteristics of a captured image of a subject based on the input/output characteristics, the saturation level, and the defect map for each pixel, which are acquired by the above-described calibration operation, and determining a drive mode of the next frame for each pixel.

Figure 11:
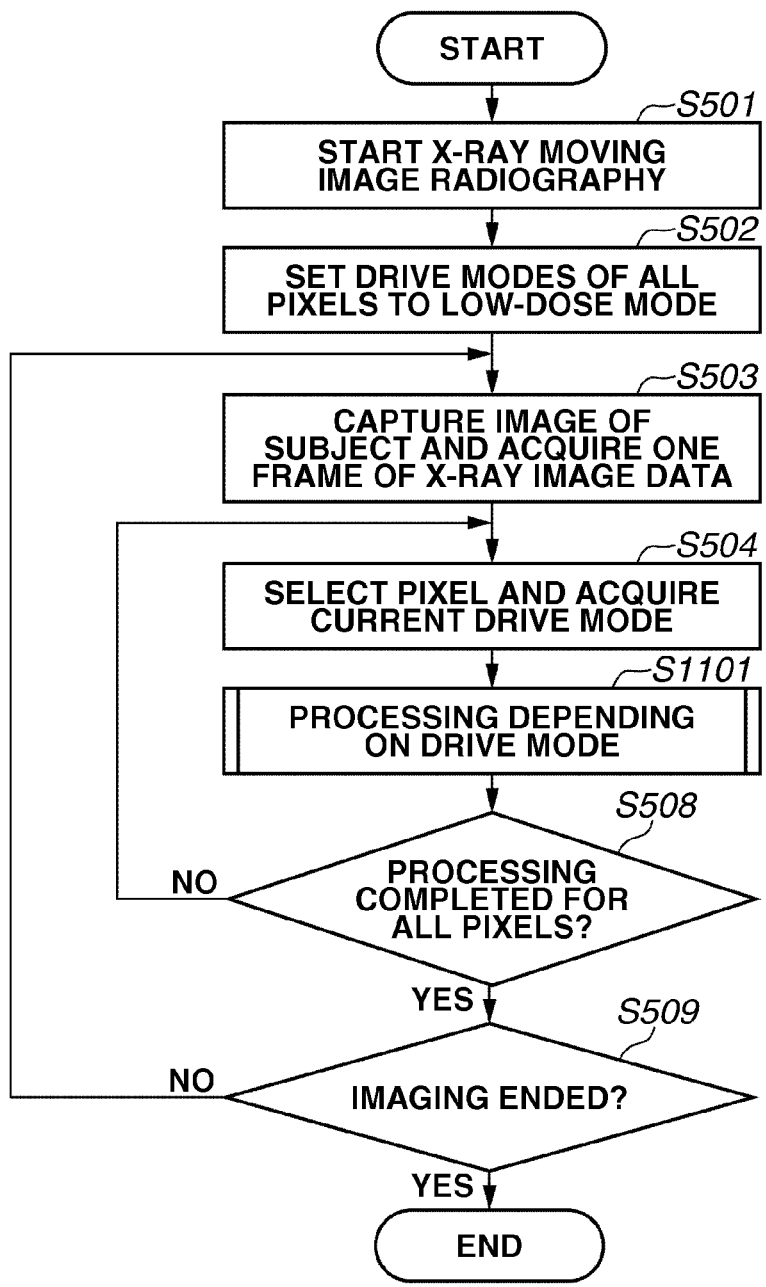
FIG. 11 is a flowchart illustrating a processing procedure of an imaging operation according to the second exemplary embodiment.

First, an overall flow of the operation will be described with reference to the flowchart illustrated in FIG. 11. In step S501, similar to the first exemplary embodiment, the X-ray moving image radiography is started based on the control of the CPU 108. In step S502, according to the determination by the mode setting unit 116, the imaging control unit 209 sets the drive mode of all pixels to the low-dose mode. In step S503, the control device 803 acquires one frame of the X-ray image data from the FPD 802. Then in step S504, the control device 803 acquires a drive mode of the target pixel sequentially selected by the CPU 108.

Next in step S1101, the CPU 108 performs processing in accordance with the acquired drive mode. More specifically, the CPU 108 performs processing for the low-dose mode on a pixel in the low-dose mode, processing for the middle-dose mode on a pixel in the middle-dose mode, and processing for the high-dose mode on a pixel in the high-dose mode among the drive modes. The processing for the respective drive modes will be described based on FIG. 12, FIG. 13, and FIG. 14.

The CPU 108 repeatedly performs the above-described processing in steps S504 and S1101 until it is determined in step S508 that all pixels included in one frame of the X-ray image data are processed. Further, the CPU 108 repeats the above-described processing in steps S503 through S504, S1101, and S508 until the imaging end instruction is issued in step S509. In step S509, the CPU 108 successively performs processing on one frame of the X-ray image data sequentially acquired, so that the imaging operation according to the present exemplary embodiment is continuously performed.

Figure 12:
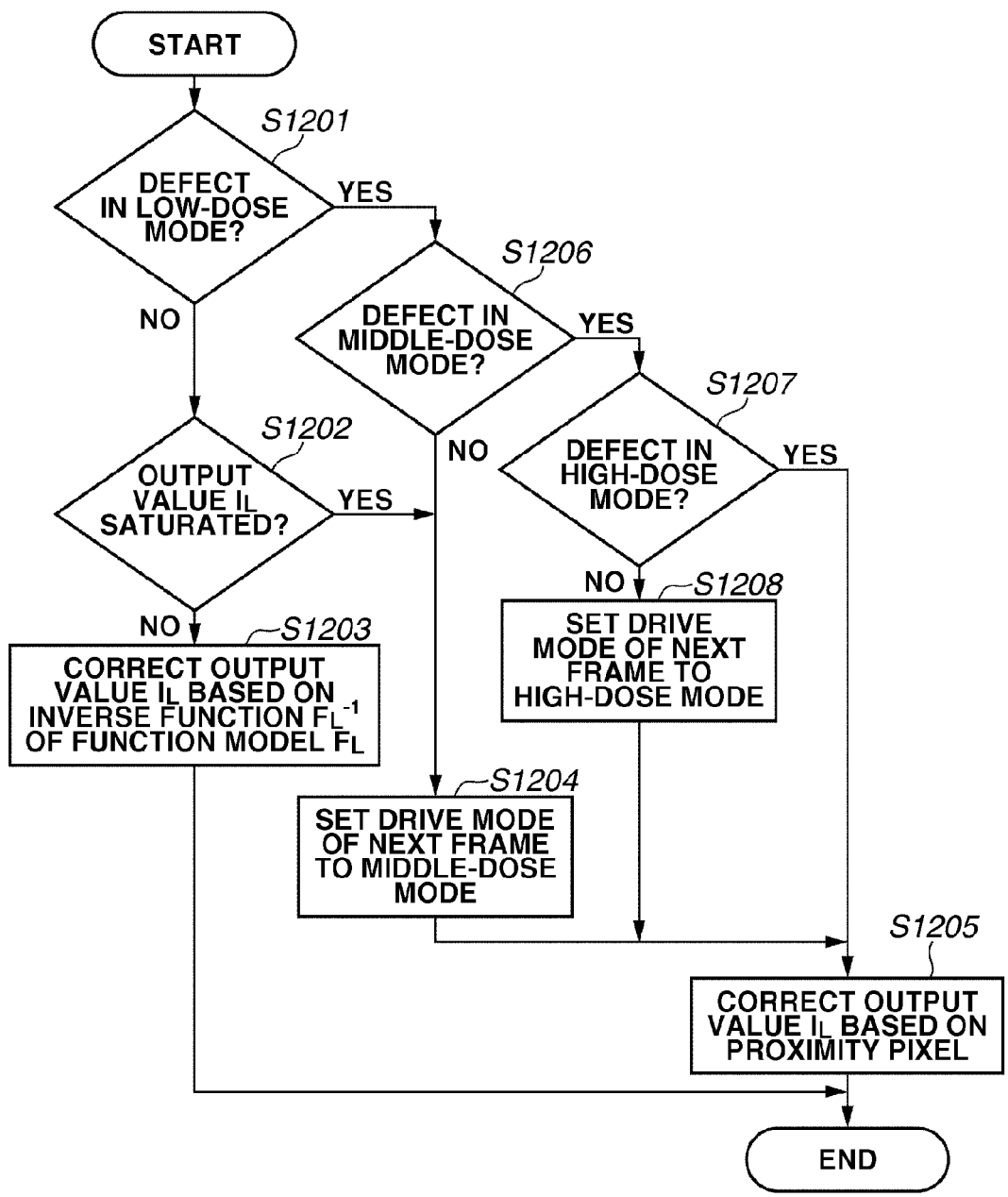
FIG. 12 is a flowchart illustrating a processing procedure on a pixel in a low-dose mode according to the second exemplary embodiment.

The processing on the target pixel in the low-dose mode in the above-described step S1101 will be described in accordance with the flowchart illustrated in FIG. 12. First, in step S1201, the defect determination unit 801 determines whether a pixel of the sensor corresponding to the target pixel is a defect pixel in the low-dose mode. In the present exemplary embodiment, the determination is made using the defect map $D_L(x, y)$ generated by the calibration operation. More specifically, it is determined as a defect pixel when $D_L(x, y)$ is equal to one.

Next, in step S1202, with respect to the target pixel (x, y) of the image data corresponding to a pixel which is determined as a non-defect pixel in the low-dose mode, the saturation determination unit 113 determines whether the target pixel is saturated. The determination method is similar to the processing in steps S601 and S602 in the first exemplary embodiment, and therefore redundant descriptions will be omitted.

Next, in step S1203, with respect to the target pixel (x, y) of the image data corresponding to the pixel determined as unsaturated, the characteristic correction unit 114 corrects input/output characteristics of an output value $I_L(x, y)$. The correction method is similar to the processing in step S605 in the first exemplary embodiment, and therefore redundant descriptions will be omitted.

On the other hand, if the target pixel is determined as saturated in the processing in step S1202 (YES in step S1202), in step S1204, the mode setting unit 116 sets the drive mode of the next frame to the middle-dose mode. Then, in step S1205, the saturation correction unit 115 corrects an output value $I_L(x, y)$. The processing in these steps are basically equivalent to the processing in steps S603 and S604 in the first exemplary embodiment. However, in step S1205 in the present exemplary embodiment, when a mean value within a block is calculated as a correction value, the saturated pixels and the defect pixels within the block are excluded from the calculation of the mean value, and a mean value of the remaining pixels is calculated as the mean value within the block.

If the pixel is determined, in the processing in step S1201, as the defect pixel in the low-dose mode (YES in step S1201), in step S1206, the defect determination unit 801 determines whether the pixel is a defect pixel using the defect map $D_M(x, y)$ in the middle-dose mode. If the pixel is determined as the non-defect pixel in the middle-dose mode (NO in step S1206), then in steps S1204 and S1205, the mode setting unit 116 sets the drive mode of the next frame to the middle-dose mode, and the saturation correction unit 115 corrects the output value $I_L(x, y)$.

If the pixel is determined, in the processing in step S1206, as the defect pixel in the middle-dose mode (NO in step S1206), then in step S1207, the defect determination unit 801 determines whether the pixel is a defect pixel using the defect map $D_H(x, y)$ in the high-dose mode.

If the pixel is determined as the non-defect pixel in the high-dose mode (NP in step S1206), in step S1208, the mode setting unit 116 sets the drive mode of the next frame to the high-dose mode. Then, in step S1205, the characteristic correction unit 114 corrects the output value $I_L(x, y)$ regardless of the determination results.

Figure 13:
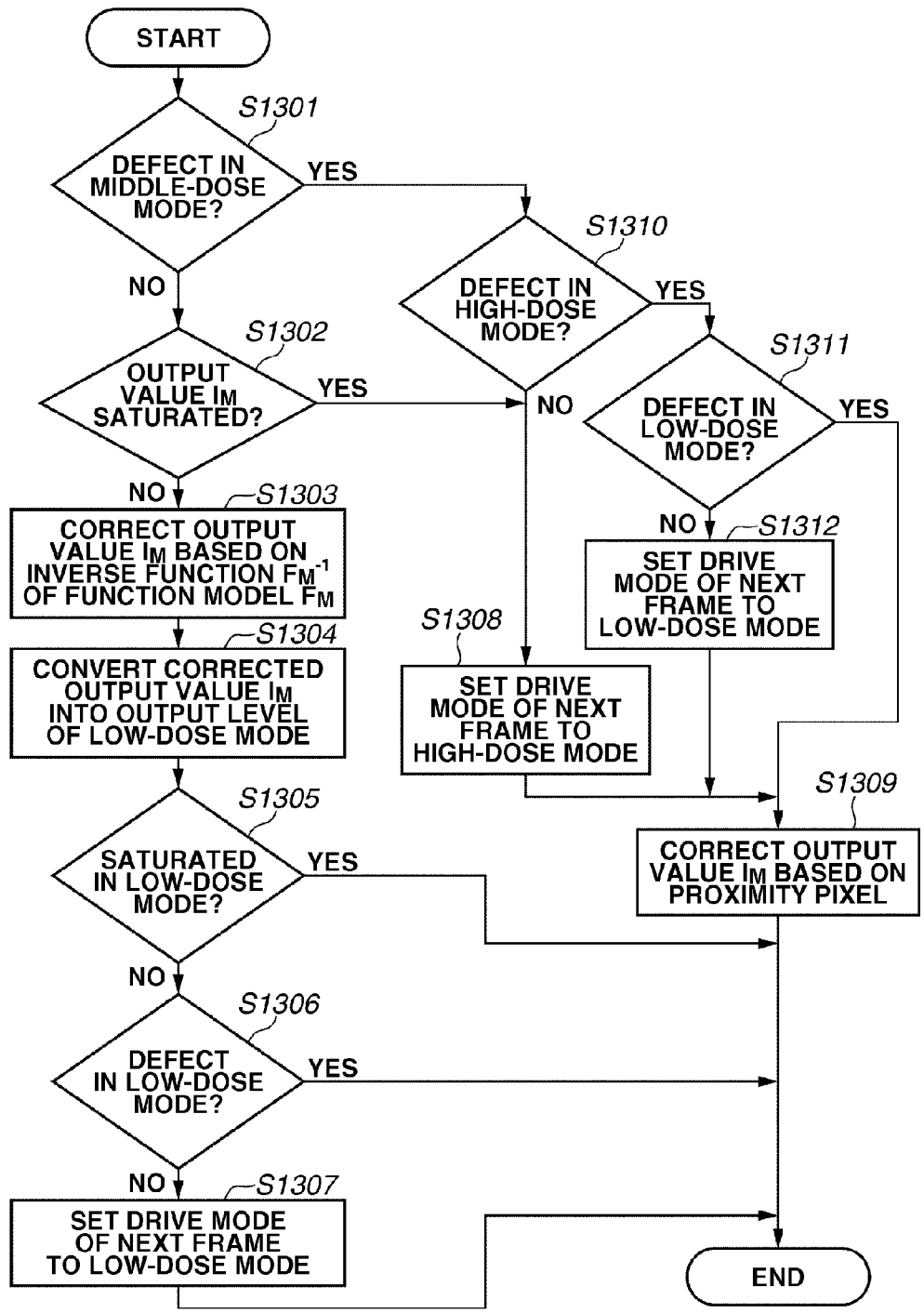
FIG. 13 is a flowchart illustrating a processing procedure on a pixel in a middle-dose mode according to the second exemplary embodiment.

In accordance with the flowchart illustrated in FIG. 13, the processing on the target pixel in the middle-dose mode in the processing in step S1101 will be described.

First in step S1301, the defect determination unit 801 determines whether the target pixel is a defect pixel in the middle-dose mode using the defect map $D_M(x, y)$. If the target pixel is not the defect pixel (NO in step S1301), in step S1302, the saturation determination unit 113 determines whether the target pixel is saturated using the saturation level $S_M(x, y)$. If the target pixel is not saturated (NO in step S1302), in step S1303, the characteristic correction unit 114 corrects the input/output characteristics of the output value $I_M(x, y)$ using a function $F_M^{-1}(x, y)$. The processing in these steps is similar to the processing in steps S1201 through S1203 on a pixel in the low-dose mode, and therefore redundant descriptions will be omitted. Next in step S1304, the characteristic correction unit 114 converts the output value $I_M(x, y)$ whose input/output characteristics has been corrected to an output level of the low-dose mode using the output conversion coefficient $R_{ML}(x, y)$. For the conversion method, the following equation (8) is used similar to the processing in step S707 in the first exemplary embodiment.

$$I'_M(x,y) = R_{ML}(x,y) I_M(x,y) \qquad (8)$$

Next in step S1305, the saturation determination unit 113 determines whether a pixel of the sensor corresponding to the target pixel in the low-dose mode is saturated based on an output value $I_M'(x, y)$ converted into an output level of the low-dose mode and a saturation level $S_L(x, y)$ corresponding to the pixel.

If the pixel of the sensor is not saturated (NO in step S1305), in step S1306, the defect determination unit 801 determines whether the pixel is a defect pixel based on the defect map $D_L(x, y)$. Only when both steps S1305 and S1306 are negative determination (NO in step S1306), in step S1307, the mode setting unit 116 sets the drive mode of the next frame to the low-dose mode according to the determination thereof.

For a pixel determined as saturated in the processing in step S1302 (YES in step S1302), in step S1308, the drive mode of the next frame is set to the high-dose mode according to the determination by the mode setting unit 116. In step S1309, the saturation correction unit 115 corrects the output value $I_M(x, y)$. The processing in these steps is similar to the processing in steps S1204 and S1205 on a pixel of the low-dose mode, and therefore redundant descriptions will be omitted.

For the pixel determined, in the above-described processing in step S1301, as the defect pixel in the middle-dose mode (YES in step S1301), in step S1310, the defect determination unit 801 similarly determines whether the pixel is a defect pixel using the defect map $D_H(x, y)$ in the high-dose mode. For the pixel determined as the non-defect pixel in the high-dose mode (NO in step S1310), in steps S1308 and S1309, the mode setting unit 116 sets the drive mode of the next frame to the high-dose mode, and the saturation correction unit 115 corrects the output value $I_M(x, y)$.

For the pixel determined as the defect pixel in the high-dose mode in the processing in step S1310 (YES in step S1310), in step S1311, the defect determination unit 801 determines whether the pixel is a defect pixel using the defect map $D_L(x, y)$ in the low-dose mode.

For the pixel determined as the non-defect pixel in the low-dose mode (NO in step S1311), in step S1312, the drive mode of the next frame is set to the low-dose mode according to the determination by the mode setting unit 116. Then, in step S1309, the characteristic correction unit 114 corrects the output value $I_M(x, y)$ regardless of the determination results.

Figure 14:
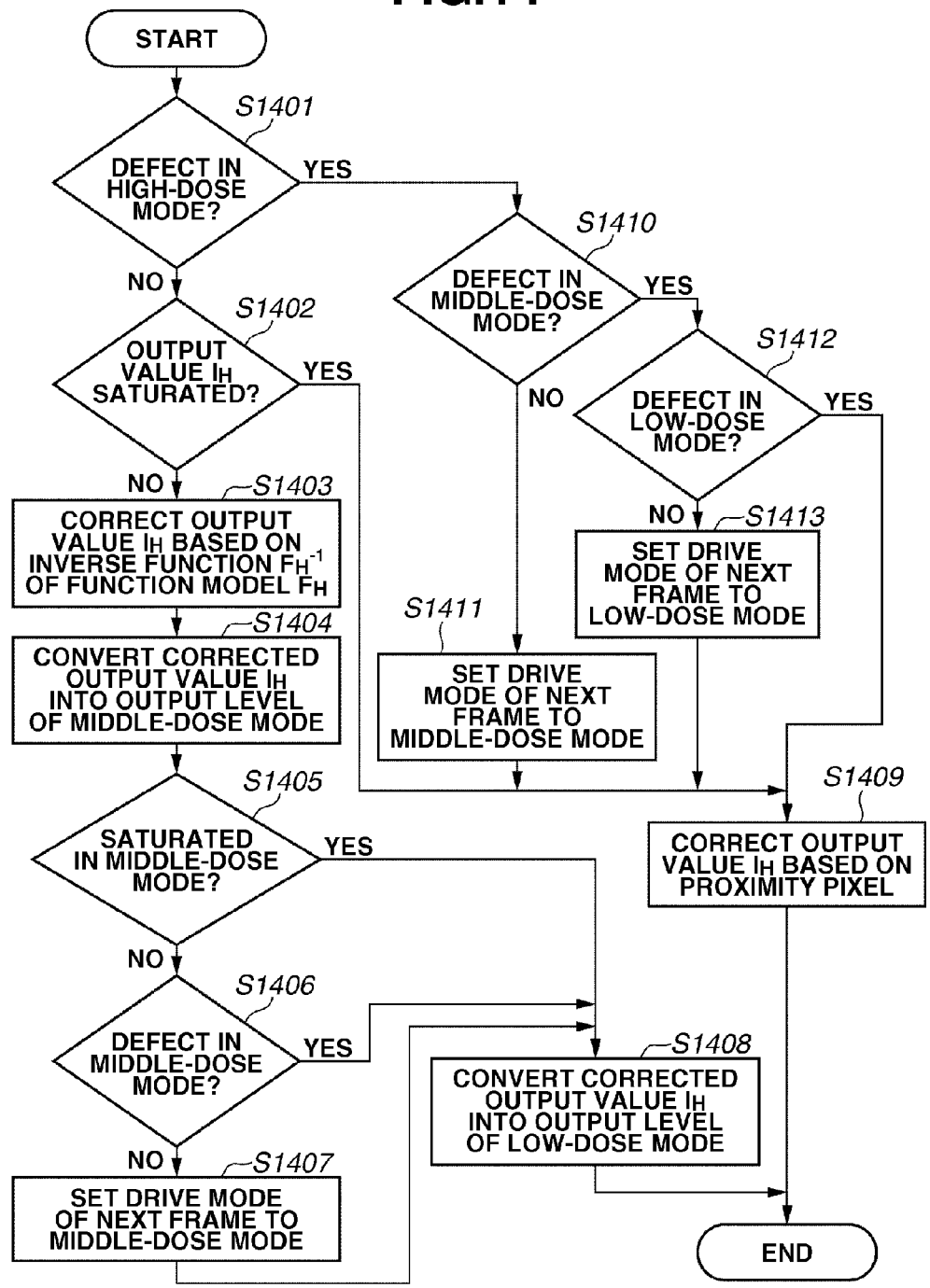
FIG. 14 is a flowchart illustrating a processing procedure on a pixel in a high-dose mode according to the second exemplary embodiment.

In accordance with the flowchart illustrated in FIG. 14, the processing on the target pixel in the high-dose mode in step S1101 will be described.

First, in step S1401, the defect determination unit 801 determines whether a pixel of the sensor corresponding to the target pixel is a defect pixel in the high-dose mode using the defect map $D_H(x, y)$. If the pixel is not the defect pixel (NO in step S1401), in step S1402, the saturation determination unit 113 determines whether the pixel is saturated using the saturation level $S_H(x, y)$.

For the pixel which is not saturated (NO in step S1402), in step S1403, the characteristic correction unit 114 corrects the input/output characteristics of the output value $I_H(x, y)$ using a function $F_H^{-1}(x, y)$. Then in step S1404, the characteristic correction unit 114 converts the corrected output value $I_H(x, y)$ into an output level of the middle-dose mode using the output conversion coefficient $R_{HM}(x, y)$.

In step S1405, the saturation determination unit 113 determines whether the pixel is saturated in the middle-dose mode using the saturation level $S_M(x, y)$. Then in step S1406, the defect determination unit 801 determines whether the pixel is a defect pixel using the defect map $D_M(x, y)$. Only when the both steps S1405 and S1406 are negative determination (NO in steps S1405 and S1406), in step S1407, the mode determination unit 114 determines that the pixel is in the middle-dose mode, and accordingly the imaging control unit 209 (the data collection unit 105) sets the drive mode of the next frame to the middle-dose mode. The processing in these steps is similar to the processing in steps S1301 through S1307 on the pixel in the middle-dose mode, and therefore redundant descriptions will be omitted.

Next, regardless of the determination results in the processing in steps S1405 and S1406, in step S1408, the characteristic correction unit 114 further converts an output value, which has been converted into the output level of the middle-dose mode in the processing in step S1404, into an output level of the low-dose mode using the output conversion coefficient $R_{ML}(x, y)$. The conversion method is similar to the processing in step S1304 on the pixel of the middle-dose mode, and therefore redundant descriptions will be omitted.

For the pixel determined as saturated in the processing in step S1402 (YES in step S1402), in step S1409, the saturation correction unit 115 corrects the output value $I_H(x, y)$, The correction method is similar to the processing in step S1309 on the pixel of the middle-dose mode, and therefore redundant descriptions will be omitted.

For the pixel determined as the defect pixel in the high-dose mode in the processing in step S1401 (YES in step S1401), in step S1410, the defect determination unit 801 determines whether the pixel is a defect pixel in the middle-dose mode using the defect map $D_M$. For the pixel determined as the non-defect pixel in the middle-dose mode (NO in step S1410), in step S1411, the drive mode of the next frame is set to the middle-dose mode according to the determination by the mode setting unit 116. According to the determination, the imaging control unit 209 sets the drive mode of the pixel to the middle-dose mode.

For the pixel determined as the defect pixel in the middle-dose mode in the processing in step S1410 (YES in step S1410), in step S1412, the defect determination unit 801 determines whether the pixel is a defect pixel using the defect map $D_L(x, y)$ in the low-dose mode. For the pixel determined as the non-defect pixel in the low-dose mode (NO in step S1412), in step S1413, the drive mode of the next frame is set to the low-dose mode according to the determination by the mode setting unit 116. Then, regardless of the determination results, the characteristic correction unit 114 corrects the output value $I_H(x, y)$ by the processing in step S1409.

According to the second exemplary embodiment, even when a defect pixel according to a drive mode exists, an optimum drive mode can be set for each pixel by avoiding an influence of the defect pixel.

According to the above-described exemplary embodiment, when the accumulation capacitance is increased for a pixel determined as saturated, determination whether the saturated pixel is a defect pixel is not to be made, however, determination of the defect pixel may be made.

Figure 15:
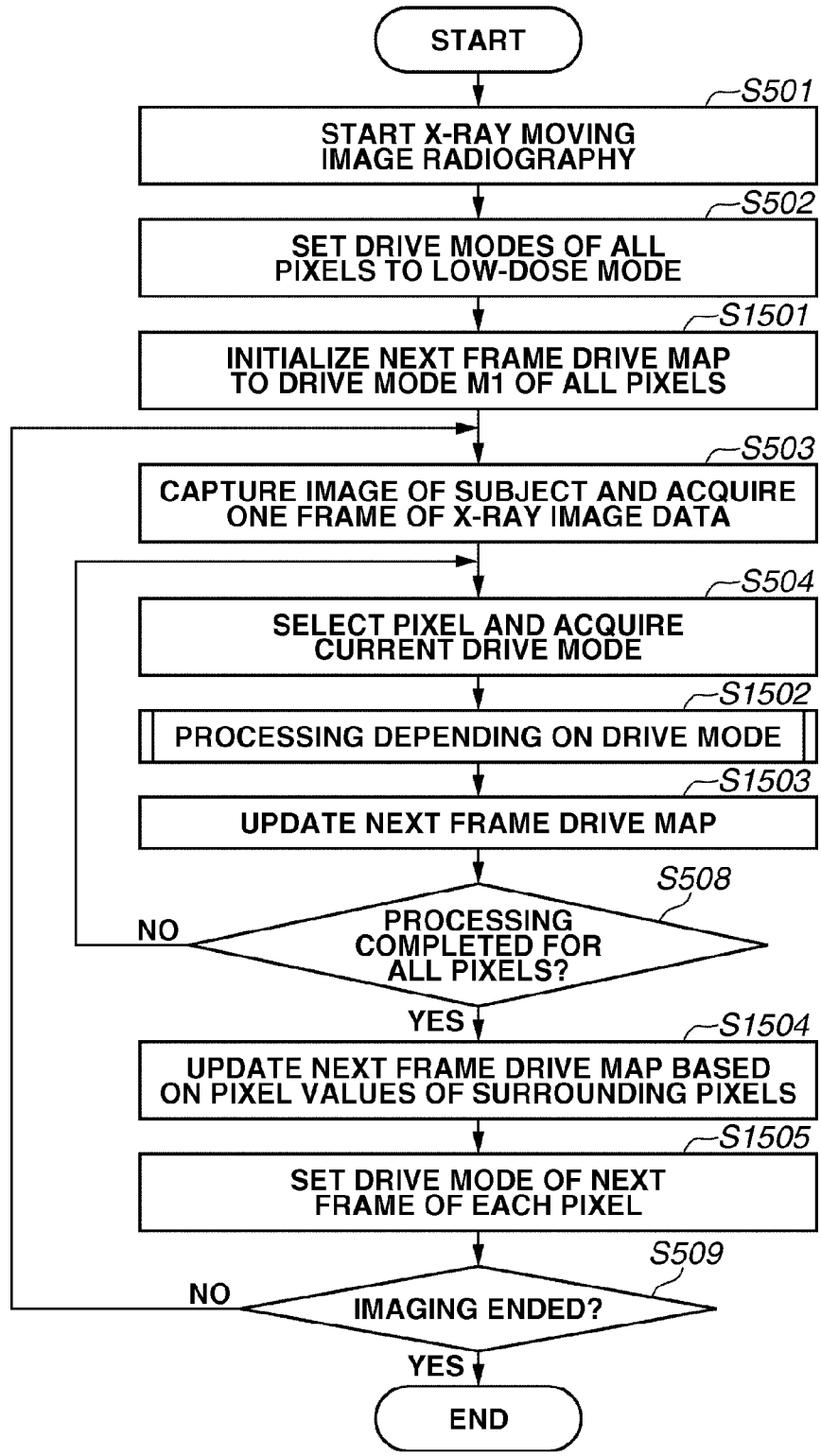
FIG. 15 is a flowchart illustrating a processing procedure of an imaging operation according to a third exemplary embodiment.

In a third exemplary embodiment, eight types of imaging modes can be set for each pixel, and accumulation capacitances can be changed in eight steps. Further, a next frame drive map indicating a drive mode of each pixel is stored in the main memory 109 and is successively updated according to the determination by the mode setting unit 116. The drive mode of each pixel is corrected based on a drive mode of surrounding pixels of the pixel. The correction processing is performed by the mode setting unit 116. Referring to FIG. 15, the present exemplary embodiment will be described.

In each pixel of an image sensor, additional capacitance elements Cfd1, Cfd2, and Cfd3 with a capacitance ratio 1:2:4, for example, can be respectively connected in parallel with the photoelectric conversion element via the switch element. Further, an accumulation capacitance element Cfd connected to the photoelectric conversion element without involving the switch element is included. Each switch element is turned on or off by signals WID1, WID2, and WID3 output from the imaging control unit 209, respectively. In this way, the imaging control unit 209 can independently control a connection state between each of the additional capacitance elements Cfd1, Cfd2, and Cfd3 and the photoelectric conversion element, and as a result, a magnitude of the accumulation capacitance can be set to eight patterns.

According to the above-described exemplary embodiments, the drive mode is determined for each pixel, however the drive mode does not significantly change on a local basis in the usual X-ray image. Thus, when the drive modes are significantly different between the adjacent pixels, it is considered that the difference is often due to influence of noise. Thus, in the present exemplary embodiment, a drive mode of each pixel is corrected based on an output value of a pixel and the drive modes of surrounding pixels. By correcting the drive mode of the pixel by the drive modes of the surrounding pixels, the influence of noise can be suppressed, and the noise caused by the large variation of the modes for each pixel can be reduced.

The processing procedure in the imaging operation of the X-ray imaging apparatus 100 differs from that in the first exemplary embodiment, and an operation according to the present exemplary embodiment is based on the flowchart illustrated in FIG. 15. According to the X-ray imaging apparatus 100 in FIG. 1, the units that operate in the similar manner to those in the first exemplary embodiment are denoted by the same reference numerals, and therefore descriptions in detail thereof will be omitted. Further, in the flowchart illustrated in FIG. 15, the steps that are carried out in the similar manners to those in the flowchart illustrated in FIG. 4 are denoted by the same numerals. Configurations which are different from the above-described first exemplary embodiment are specifically described below.

<Calibration Operation>

Similar to the first exemplary embodiment, the calibration operation is performed in accordance with the flowchart illustrated in FIG. 2. However, two drive modes, i.e., the low-dose mode and the high-dose mode are used in the first exemplary embodiment, while in the present exemplary embodiment, similar calibration operations are to be performed for eight modes from a mode M1 to a mode M8. Usable dose regions are different among the modes M1 through M8. Suppose that the mode M1 has the minimum dose region, and the dose regions increase in order in the mode M2 and beyond, and the mode M8 has the maximum dose region. The detail of the calibration operation is similar to that in the first exemplary embodiment, and therefore redundant descriptions will be omitted.

<Imaging Operation>

The imaging operation of the X-ray imaging apparatus 100 according to the present exemplary embodiment will be described with reference to the flowchart illustrated in FIG. 15. First, in step S501, similarly to the first exemplary embodiment, the CPU 108 starts the X-ray moving image radiography. Then in step S502, the imaging control unit 209 sets the drive mode of all pixels to the mode M1 which is a mode with the lowest dose.

Next, in step S1501, the CPU 108 initializes a next frame drive map M(x, y), which is a characteristic processing of the present exemplary embodiment. The next frame drive map is the one which stores the drive mode of the next frame of the X-ray detector 104 for each pixel, and in the present exemplary embodiment, the next frame drive map stores either of 1 through 8 as a value corresponding to the modes M1 through M8. As an initialization operation, the values of all pixels of the next frame drive map M(x, y) are set to one.

Next in step S503, the CPU 108 acquires one frame of the X-ray image data. Then in step S504, the CPU 108 acquires a drive mode by focusing on a certain pixel, and in step S1502, the imaging control unit 209 perform processing in accordance with the acquired drive mode. More specifically, the imaging control unit 209 performs processing corresponding to either of the drive modes M1 through M8, such that processing for the mode M1 on a pixel of the mode M1, processing for the mode M2 on a pixel of the mode M2, and so on. The processing in the respective drive modes are basically similar to the first or second exemplary embodiment. If a pixel is saturated, the drive mode of the next frame is changed to one step higher dose side. If the pixel is not saturated, the saturation determination unit 113 performs saturation determination in the drive mode of one step lower dose side. In the case of negative determination, the saturation determination unit 113 changes the drive mode to one step lower dose side.

If the drive mode is changed in the next frame of the target pixel (x, y) in the processing in step S1502, then in step S1503, the next frame drive map M(x, y) is updated by the corresponding value. For example, in step S1502, if a pixel which operates in the drive mode M3 is changed to the drive mode M4 in the next frame, a value of the next frame drive map M(x, y) corresponding to the pixel is updated to four.

If the above-described processing in steps S504, S1502, and S1503 are repeatedly performed on all pixels (x, y) included in one frame of the X-ray image data (YES in step S508), in step S1504, the mode setting unit 116 performs correction of the next frame drive map M(x, y). In this process, a value obtained by weighted addition of the proximity pixels which have high correlation with each pixel of the M(x, y) is regarded as the corrected value.

$$M'(x, y) = \frac{\sum_{\Delta x=-N}^{N} \sum_{\Delta y=-N}^{N} W(\Delta x, \Delta y) M(x+\Delta x, y+\Delta y)}{\sum_{\Delta x=-N}^{N} \sum_{\Delta y=-N}^{N} W(\Delta x, \Delta y)} \quad (9)$$

Where, N represents a constant for specifying a range of the proximity pixels to be referred to. In the exemplary embodiment, for example, N is two. Further, W represents a function for setting a weight coefficient for each pixel of the proximity pixels. In the present exemplary embodiment, the function system to be used is not especially specified, and for example, a Gaussian function as expressed by the following equation (10) is used.

$$W(\Delta x, \Delta y) = \exp\left(-\frac{\Delta x^2}{2\sigma^2} - \frac{\Delta y^2}{2\sigma^2}\right) \quad (10)$$

Where, σ represents a standard deviation of the Gaussian function. In the present exemplary embodiment, for example, σ is N. It is necessary to store integers 1 through 8 in the next frame drive map M'(x, y) after correction. Therefore, the integers after rounding off the M'(x, y) actually calculated by the above equation (10) are stored.

Finally, in step S1505, the mode setting unit 116 outputs an instruction to set the drive mode of the next frame of each pixel according to the next frame drive map M'(x, y) corrected in the processing in step S1504. The imaging control unit 209 (the data collection unit 105) changes the drive mode of each pixel according to the instruction. Further, in step S509, the imaging control unit 209 repeats the processing in step S503 and the subsequent steps until an imaging end instruction is issued, and one frame of sequentially acquired X-ray image data is successively processed, so that the imaging operation of the present exemplary embodiment can be continuously performed.

In the third exemplary embodiment, even when the drive mode of the next frame is greatly different from those of the proximity pixels due to the influence of noise or the like, the drive mode can be corrected based on the saturation status or the drive mode of the highly correlated proximity pixels, and an optimum drive mode can be set for each pixel.

According to the present exemplary embodiment, for example, even when the drive mode is set to the mode M4, or the mode M3, or the mode M2, the mode setting unit 116 may determine to set the drive mode to the mode M2, when it is determined that the pixel is not saturated. By determining a change amount of the accumulation capacitance based on the input/output characteristics in this way, images which can satisfy both of the high dynamic range and the high sensitivity at the same time can be obtained.

According to the above-described exemplary embodiments, regarding the input/output characteristics of pixels, the low-dose region is modeled by a linear function, and the high-dose region is modeled by a nonlinear function. However, when a dose equivalent value is too small, a SN ratio may be lowered and image quality may be deteriorated. Thus, in a fourth exemplary embodiment, a characteristic of the SN ratio to an incident dose is obtained, and when the SN ratio is lower than a permissible SN ratio, a change to the mode is not allowed, even when the saturation determination unit 113 does not determine that the pixel is saturated. The configuration of the apparatus is similar to that in the first or second exemplary embodiment, and therefore redundant descriptions will be omitted.

The characteristic calculation unit 112 in the control device 103 captures a plurality of white image data pieces by varying a dose for each dose mode, and calculates SN ratios for the image data. A known method is used for the calculation method for the SN ratio. Accordingly, data indicating characteristics of the SN ratio to the incident dose for each dose mode can be obtained. The SN ratio characteristic data is stored in the main memory 109. In this way, the characteristic calculation unit 112 serves as a characteristic acquisition unit of SN characteristics.

In addition, a threshold value indicating a lower limit of the SN ratio is stored in advance in the main memory 109. The threshold value may be set by a user, or a predetermined value empirically obtained may be stored.

If it is determined that a pixel which is set to the low-dose mode is not saturated, the mode setting unit 116 in the control device 103 determines an SN ratio corresponding to an output value of the pixel with reference to the SN ratio characteristic data. The processing is performed by obtaining an incident dose corresponding to an output value based on the equation 5 in the first exemplary embodiment and by identifying the corresponding SN ratio from the incident dose and the SN ratio characteristic data.

If it is determined that the SN ratio is smaller than the threshold value stored in the main memory 109, the pixel is changed to the high-dose mode.

As another situation, if it is determined that the pixel set to the high-dose mode is not saturated, the mode setting unit 116 obtains the SN ratio corresponding to an output value of the pixel with reference to the SN ratio characteristic data. If it is determined that the SN ratio is smaller than the threshold value stored in the main memory 109, the pixel is changed to the low-dose mode.

As described above, by determining whether to decrease an accumulation capacitance based on the input/output characteristics and the SN characteristic of each pixel, the SN characteristic of an image can be prevented from being greatly lowered, and images with good image quality can be provided to the user.

According to the above-described exemplary embodiments, the saturation determination processing and the correction processing are performed for each pixel, however, if X-ray image data is divided into, for example, pixel blocks composed of five by five pixels, and the processing similar to the first exemplary embodiment is performed on each pixel block, similar effects can be obtained. In addition, in this case, a load of the processing can be reduced compared with the case of determining for each pixel. Further, a number of wirings to be mounted on a substrate can be decreased compared with the case of providing the WID signal on a pixel basis, so that the mounting can be easier and the yield can be improved.

As another exemplary embodiment, the CPU 108 may identify a partial region on an image based on a range specified by an operator via the operation panel 110, and the mode setting unit 116 changes a drive mode only for a pixel of a sensor corresponding to the partial region from other regions. Accordingly, an image with high sensitivity or an image with high dynamic range can be obtained only for a range selected by the user.

Further, in the above-described exemplary embodiments, an accumulation capacitance is forcibly changed according to whether a pixel is saturated or an SN ratio is within a permissible value. However, it is conceivable that an image will be minutely changed at an unexpected timing during the imaging operation due to a change of the mode. In order to avoid such a case, in another exemplary embodiment, a warning may be issued to a user so that the user can manually change the mode by an input via the operation unit.

More specifically, the control device 103 causes the display unit 111 to display a message, an image, an icon, or combinations thereof for indicating a warning according to the saturation of the pixel or the decrease of the SN ratio. The display may be turned on if one of the pixels is saturated, or the display may be turned on when a number of the saturated pixels exceeds a predetermined threshold value to notify the user accordingly. Alternatively, a position of the saturated pixel may be superimposedly displayed in a reduced image and synchronized with capturing of moving images. Further, a warning may be displayed when pixels which are saturated in a partial region near the center of an image exist more than the predetermined threshold value. The control of such display can be performed by the CPU 108 receiving an output result of the saturation determination unit 113 and reading a program.

The operation panel 110 may include a mode change button for receiving an input for instructing a drive mode, and the mode setting unit 116 may perform processing for changing the drive mode in response to pressing of such a button. The mode setting unit 116 may instruct the imaging control unit 209 in the FPD 102 to turn the WID signal high or low so as to change an accumulation capacitance to be used for capturing of the next frame image, if the X-ray detector 104 is accumulating electric charges at a timing when the button is pressed. When the X-ray detector 104 is not accumulating charges, the mode setting unit 116 may immediately instruct the imaging control unit 209 to turn the WID signal high or low. According to the above-described operations, an unexpected change of images during the imaging operation can be prevented.

According to the above-described exemplary embodiments, it is determined whether the pixel is saturated, however, the drive mode may be automatically changed if the pixel deviates from a region which is good in linearity. In this case, the saturation determination unit 113 determines for each pixel whether a dose which makes the input/output characteristics nonlinear is irradiated based on the input/output characteristics of each pixel calculated by the characteristic calculation unit 112. With respect to the pixel determined as nonlinear, the mode setting unit 116 performs determination to change an imaging mode and enlarge an accumulation capacitance for each pixel. In response to the determination, the imaging control unit 209 in the FPD 102 outputs the WID signal to set the accumulation capacitance of each pixel. Accordingly, the input/output characteristics is made linear constantly, noise of images associated with modeling and corrections of the input/output characteristics including a linear region and a nonlinear region can be suppressed. Such a configuration is especially useful in the case of imaging in the low-dose, or in the case where the sensor has sufficient sensitivity. In addition, a warning display as described above may be performed, and the user may be prompted to manually change the mode.

According to the above-described exemplary embodiments, the example for changing an accumulation capacitance within a pixel is described, however, a gain of the differential amplifier 208 outside a pixel or outside a sensor substrate may be changed. In this case, a plurality of additional capacitances needs not to be provided as in the second exemplary embodiment or the third exemplary embodiment, and the gain can be changed in multiple steps with an inexpensive configuration.

Further, according to the above-described exemplary embodiments, the X-ray imaging apparatus is described, however, the embodiment also includes imaging apparatuses that perform imaging by a visible light or light in other wavelength zones. In this case, the concept which is described as a "dose" in the above-described exemplary embodiments will be replaced with "amount of light".

Further, the imaging apparatus using an area sensor is described as the example in the above-described exemplary embodiments, however, it is not limited to the area sensor, and a line sensor or a sensor including two rows may be used.

An X-ray image has peculiar features, such as which is an image to be used for a diagnosis, no color information is included therein, and which is often used for capturing images of an object having a relatively large dynamic range like a human body. Because of these peculiar features, to satisfy both of imaging with high sensitivity and imaging with an extended dynamic range at the same time is significant. Therefore, useful images for the purposes of diagnosis can be obtained by an X-ray imaging apparatus or a control device of an X-ray sensor, in accordance with the embodiment of the present invention.

Further, the embodiment includes a case in which the above-described exemplary embodiments are realized by supplying programs of software for implementing the functions of the above-described exemplary embodiments (i.e., the programs corresponding to the flowcharts illustrated in the drawings) to an apparatus, and by causing a computer of the apparatus to read out and execute a supplied program code.

Therefore, in order to realize the functions and processing according to the embodiment of the present invention by a computer, the program code itself installed on the computer is also the one which realizes the embodiment of the present invention. In other words, the embodiment includes a computer program itself for realizing the functions and processing according to the embodiments of the present invention.

Further, the functions of the above-described exemplary embodiments can be implemented by reading out and executing the program by the computer. In addition, when an operating system (OS) or the like which is running on the computer based on the instructions of the program performs a part or all of the above-described processing, the functions of the above-described exemplary embodiments can be implemented.

In this way, by determining whether a sensor output value is saturated for each pixel and determining an accumulation capacitance for each pixel based on the determination result, images with good contrast can be obtained while reducing saturation or an output with poor input/output characteristics in the entire imaging region.

Embodiments of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the embodiments of the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-180586 filed Aug. 22, 2011, which is hereby incorporated by reference herein in its entirety.

What is claimed is:

1. A control device configured to control a radiation sensor, the radiation sensor being capable of changing a magnitude of accumulation capacitance of an electric charge for each pixel, the control device comprising:
   an acquisition unit configured to acquire an output value according to an accumulated electric charge of each pixel of the sensor;
   a determination unit configured to determine whether the accumulation capacitance of each pixel is saturated based on the output value; and
   a setting unit configured to determine, for each pixel, a magnitude of accumulation capacitance based on the determination by the determination unit.

2. The control device according to claim 1, wherein the acquisition unit acquires an output value output by each pixel of the sensor to which the magnitude of accumulation capacitance is set by the setting unit.

3. The control device according to claim 1, further comprising a generation unit configured to correct a frame image which is an unity of the output values to generate image data.

4. The control device according to claim 3, wherein the determination unit determines whether each pixel is saturated based on a first frame image which is an unity of output values of the sensor, and
   wherein the generation unit obtains a second frame image based on output values from the sensor to which the magnitude of accumulation capacitance is set by the setting unit.

5. The control device according to claim 3, further comprising a correction unit configured to correct an output value which is output by each pixel of the sensor to which the magnitude of accumulation capacitance is set by the setting unit based on input/output characteristics of each pixel of the sensor.

6. The control device according to claim 1, wherein the setting unit sets an increase in the magnitude of accumulation capacitance of a specific pixel, if the determination unit has determined that the output value of the specific pixel is saturated.

7. The control device according to claim 1, wherein the setting unit sets a decrease in the magnitude of accumulation capacitance of a specific pixel, if the determination unit has determined that the output value of the specific pixel is not saturated.

8. The control device according to claim 1, wherein the setting unit maintains unchanged the magnitude of accumulation capacitance of a specific pixel, if the determination unit has determined that the output value of the specific pixel is not saturated.

9. The control device according to claim 1, further comprising a defect acquisition unit configured to acquire a position of a defect pixel in a frame image which is a unity of output values of the sensor,
   wherein the determination unit determines whether an accumulation capacitance of each pixel is saturated, an accumulation capacitance of each pixel is not saturated but the pixel is a defect pixel, or an accumulation capacitance of each pixel is not saturated and the pixel is not a defect pixel, based on the position of the defect pixel and the output values.

10. The control device according to claim 1, wherein, based on input/output characteristics of each pixel of the sensor, the setting unit sets a change in the magnitude of accumulation capacitance of each pixel.

11. The control device according to claim 1, wherein, based on input/output characteristics of each pixel of the sensor, the determination unit determines whether each pixel is saturated.

12. The control device according to claim 1, further comprising a characteristic acquisition unit configured to acquire input/output characteristics of each pixel of the sensor,
   wherein the input/output characteristics of each pixel indicate a relationship between an amount of radiation received at each pixel of the sensor and an output value with respect to an amount of the accumulated charge corresponding to the amount of radiation received.

13. The control device according to claim 12, wherein the characteristic acquisition unit acquires as the input/output characteristics, an input-output function which is linearly approximated in a first output range, is nonlinear in a second output range, and is constant with respect to the input.

14. The control device according to claim 12, wherein the characteristic acquisition unit obtains the input/output characteristics of each pixel, based on pixel values of a plurality of images which are obtained by irradiating the sensor a plurality of times with varying amounts of radiation.

15. The control device according to claim 1, wherein, based on at least either input/output characteristics or signal-to-noise (SN) characteristics of each pixel of the sensor, the setting unit sets a change in the magnitude of accumulation capacitance of each pixel.

16. The control device according to claim 1, wherein an output value output by each pixel is determined according to an amount of accumulated photoelectric charge with respect to the accumulation capacitance.

17. The control device according to claim 1, wherein the sensor is an X-ray sensor configured to obtain an output value according to a received radiation dose.

18. An imaging apparatus including a control device and a sensor according to claim 1.

19. The imaging apparatus according to claim 18, wherein each pixel of the sensor includes a photoelectric conversion element, a capacitance element configured to accumulate an electric charge which the photoelectric conversion element generates in response to radiation incident thereupon, and a switch element configured to bring the photoelectric conversion element and the capacitance element into a connected state and a non-connected state, and
wherein the sensor further includes a control unit configured to control the switch element according to the magnitude of accumulation capacitance set by the setting unit.

20. The control device according to claim 1, wherein magnitudes of the accumulation capacitance of pixels in the same column or row are capable of being set differently.

21. A control device that controls a sensor capable of changing a magnitude of an accumulation capacitance of an electric charge for each pixel, the control device comprising:

an output acquisition unit configured to acquire an output value according to an accumulated electric charge of each pixel of the sensor;
a characteristic acquisition unit configured to acquire input/output characteristics which is a characteristic of an output value with respect to an accumulated amount of electric charge for each pixel of the sensor; and
a setting unit configured to determine for each pixel an accumulation capacitance based on the output value and the input/output characteristics.

22. A method of controlling a radiation sensor capable of changing a magnitude of an accumulation capacitance of an electric charge for each pixel, the method comprising:
acquiring a first frame image from the sensor which receives light;
acquiring input/output characteristics of each pixel of the sensor;
determining for each pixel an accumulation capacitance based on the first frame image and the input/output characteristics of the each pixel; and
acquiring a second frame image from the sensor in which the determined accumulation capacitance is set for each pixel.

23. A method for controlling a radiation sensor, the radiation sensor being capable of changing a magnitude of accumulation capacitance of an electric charge for each pixel, the method comprising:
acquiring an output value according to an accumulated electric charge of each pixel of the sensor;
determining whether the accumulation capacitance of each pixel is saturated based on the output value; and
setting, for each pixel, a magnitude of accumulation capacitance based on the determination by the determining.

* * * * *